US012615516B2

(12) United States Patent　　(10) Patent No.: US 12,615,516 B2
Furuichi　　(45) Date of Patent: Apr. 28, 2026

(54) COMMUNICATION CONTROL DEVICE, COMMUNICATION CONTROL METHOD, COMMUNICATION DEVICE, AND COMMUNICATION METHOD

(71) Applicant: Sony Group Corporation, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 710 days.

(21) Appl. No.: 17/922,796

(22) PCT Filed: Apr. 21, 2021

(86) PCT No.: PCT/JP2021/016199

§ 371 (c)(1),
(2) Date: Nov. 2, 2022

(87) PCT Pub. No.: WO2021/246075

PCT Pub. Date: Dec. 9, 2021

(65) Prior Publication Data

US 2023/0239701 A1　　Jul. 27, 2023

(30) Foreign Application Priority Data

Jun. 3, 2020　(JP) ................................. 2020-097177

(51) Int. Cl.
*H04W 16/14*　　(2009.01)
(52) U.S. Cl.
CPC ................................... *H04W 16/14* (2013.01)
(58) Field of Classification Search
CPC ... H04W 16/14; H04W 72/0453; H04W 8/18; H04W 60/04; H04W 52/243; H04W 88/18
See application file for complete search history.

(56) References Cited

U.S. PATENT DOCUMENTS

2015/0110083 A1　4/2015　Takano
2020/0100259 A1　3/2020　Tanaka
(Continued)

FOREIGN PATENT DOCUMENTS

CN　　104335624 A　2/2015
CN　　110679169 A　1/2020
(Continued)

OTHER PUBLICATIONS

Cbrs: "Signaling Protocols and Procedures 1-15 for Citizens Broadband Radio Service (CBRS): Spectrum Access System (SAS)—Citizens Broadband Radio Service Device (CBSD) Interface Technical Specification", Oct. 31, 2018 (Oct. 31, 2018), pp. 1-60, XP093051986.

(Continued)

*Primary Examiner* — Marcus Hammonds
(74) *Attorney, Agent, or Firm* — XSENSUS LLP

(57) ABSTRACT

A method and corresponding communication control device that includes: a first receiver that receives a registration update request to update operator information about an operator who operates a communication device permitted to perform priority utilization of a frequency band, from a first operator to a second operator; and a control circuitry that, on the basis of the registration update request, updates the operator information about an operator who operates the communication device, from the first operator to the second operator, and maintains the permission for priority utilization of the frequency band by the communication device.

12 Claims, 18 Drawing Sheets

COMMUNICATION CONTROL DEVICE 130 —— DEVICE 140 OF LESSOR OR LESSEE OPERATOR

(56)                References Cited

U.S. PATENT DOCUMENTS

| | | | | |
|---|---|---|---|---|
| 2020/0260291 A1* | 8/2020 | Markwart | ............. | H04W 16/14 |
| 2021/0250959 A1* | 8/2021 | Rose | ................... | H04W 72/542 |
| 2022/0159658 A1* | 5/2022 | Hannan | ............. | H04W 72/0453 |

FOREIGN PATENT DOCUMENTS

| | | |
|---|---|---|
| EP | 2858399 A1 | 4/2015 |
| EP | 3462762 A1 | 4/2019 |
| WO | 2013/183332 A1 | 12/2013 |
| WO | WO-2015057811 A2 | 4/2015 |
| WO | 2018/220746 A1 | 12/2018 |

OTHER PUBLICATIONS

FCC: "R+O-SFNPRM Commercial Operations in the 3550-3650 ; 18-15-0039-00-0000-r-o-sfnprm-conanercial-operitions-in-the-3550-3650", IEEE Draft; 18-15-0039-00-0OOO-R-O-SFNPRM-Commercial-Operations-In-The-3550-3650, IEEE-SA Mentor, Piscataway, NJ USA, vol. 802.18, Jul. 10, 2015 (Jul. 10, 2015), pp. 1-187. XP068094936.

Winn Forum: "Requirements for Commercial Operation in the U.S. 3550-3700 MHz Citizens Broadband Radio Service Band Working Document WINNF-15-S-0112 Version V2.0.0 Feb. 3, 2017 Spectrum Sharing Committee WG1 CBRS Operational and Functional Requirements Terms, Conditions & Notices", Feb. 3, 2017 (Feb. 3, 2017), XP055613380.

International Search Report and Written Opinion mailed on Jun. 29, 2021, received for PCT Application PCT/JP2021/016199, filed on Apr. 21, 2021, 9 pages including English Translation.

"Subpart X—Spectrum Leasing", Electronic Code of Federal Regulations, Title 47, Chapter I, Subchapter A, Part 1, Available Online at: https://www.ecfr.gov/cgi-bin/text-idx?node=sp47.1.1.x, May 12, 2021, pp. 1-35.

"Part 96 Citizens Broadband Radio Service", Electronic Code of Federal Regulations, Title 47, Chapter I, Subchapter D, Part-96, Available Online at: https://www.ecfr.gov/cgi-bin/text-idx?node=pt47.5.96, May 12, 2021, pp. 1-31.

"Spectrum Sharing Committee Release Plan", WINNF-SSC-0004-V14.0.0, Release 1, Available Online at: https://cbrs.wirelessinnovation.org/policies and procedures, Aug. 21, 2018, 18 pages.

"Test and Certification for Citizens Broadband Radio Service (CBRS); Conformance and Performance Test Technical Specification; SAS as Unit Under Test (UUT)", WINNF-TS-0061-V1.5.1, Wireless Innovation Forum, Available Online at: https://cbrs.wirelessinnovation.org/release-1-of-the-baseline-standard-specifications, Oct. 7, 2019, pp. 1-180.

"FCC ULS Priority Access License (PAL) Sales and Leasing Agreements Data Recommendations", WINNF-RC-5004V1.0.0, Wireless Innovation Forum, Apr. 5, 2021, pp. 1-14.

"Requirements for Commercial Operation in the U.S. 3550-3700 MHZ Citizens Broadband Radio Service Band", WINNF-TS-0112 V1.9.1, Wireless Innovation Forum, Mar. 11, 2020, pp. 47-48 & pp. 57-59.

* cited by examiner

FIG. 5

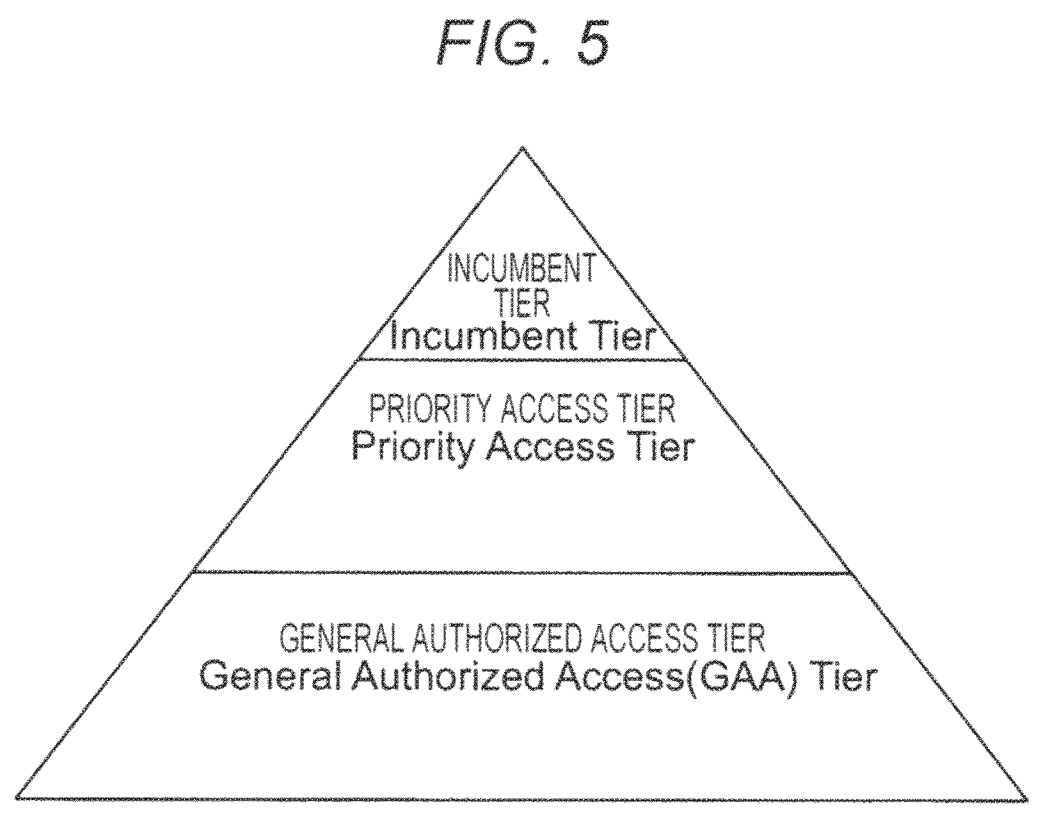

INCUMBENT TIER
Incumbent Tier

PRIORITY ACCESS TIER
Priority Access Tier

GENERAL AUTHORIZED ACCESS TIER
General Authorized Access(GAA) Tier

Figure 6:
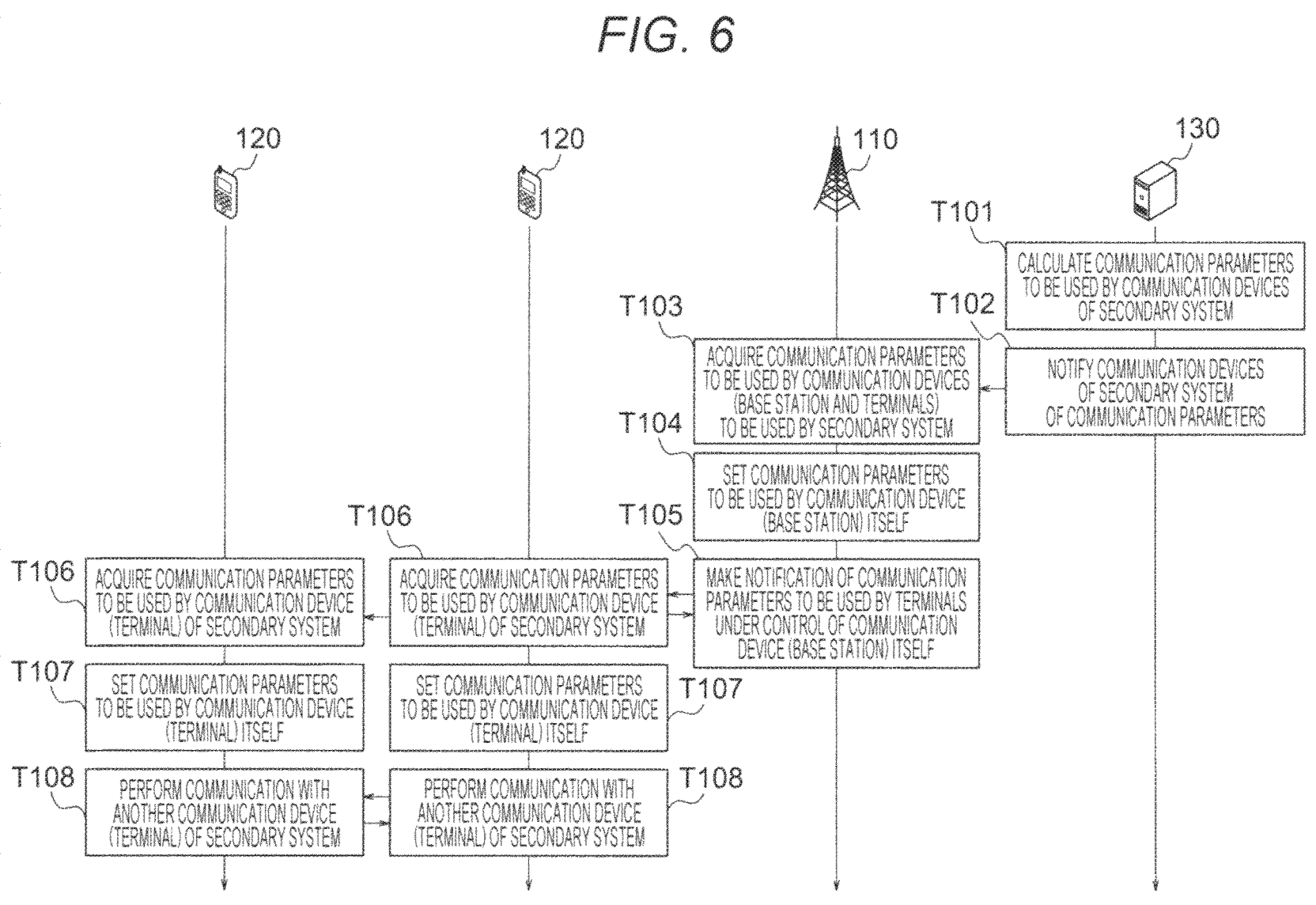

T101 CALCULATE COMMUNICATION PARAMETERS TO BE USED BY COMMUNICATION DEVICES OF SECONDARY SYSTEM

T102 NOTIFY COMMUNICATION DEVICES OF SECONDARY SYSTEM OF COMMUNICATION PARAMETERS

110

T103 ACQUIRE COMMUNICATION PARAMETERS TO BE USED BY COMMUNICATION DEVICES (BASE STATION AND TERMINALS) TO BE USED BY SECONDARY SYSTEM

T104 SET COMMUNICATION PARAMETERS TO BE USED BY COMMUNICATION DEVICE (BASE STATION) ITSELF

T105 MAKE NOTIFICATION OF COMMUNICATION PARAMETERS TO BE USED BY TERMINALS UNDER CONTROL OF COMMUNICATION DEVICE (BASE STATION) ITSELF

120

T106 ACQUIRE COMMUNICATION PARAMETERS TO BE USED BY COMMUNICATION DEVICE (TERMINAL) OF SECONDARY SYSTEM

T107 SET COMMUNICATION PARAMETERS TO BE USED BY COMMUNICATION DEVICE (TERMINAL) ITSELF

T108 PERFORM COMMUNICATION WITH ANOTHER COMMUNICATION DEVICE (TERMINAL) OF SECONDARY SYSTEM

120

T106 ACQUIRE COMMUNICATION PARAMETERS TO BE USED BY COMMUNICATION DEVICE (TERMINAL) OF SECONDARY SYSTEM

T107 SET COMMUNICATION PARAMETERS TO BE USED BY COMMUNICATION DEVICE (TERMINAL) ITSELF

T108 PERFORM COMMUNICATION WITH ANOTHER COMMUNICATION DEVICE (TERMINAL) OF SECONDARY SYSTEM

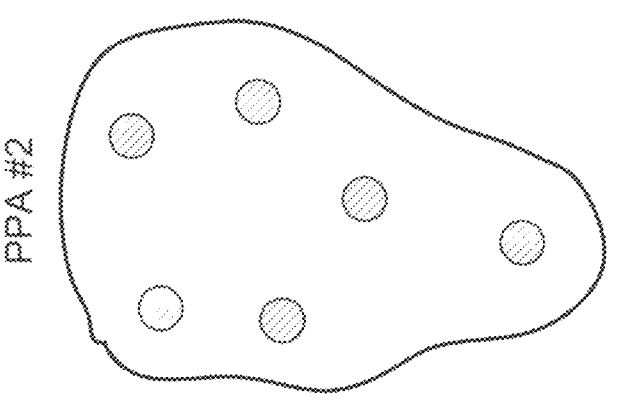
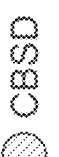
CBSD
*FIG. 7*
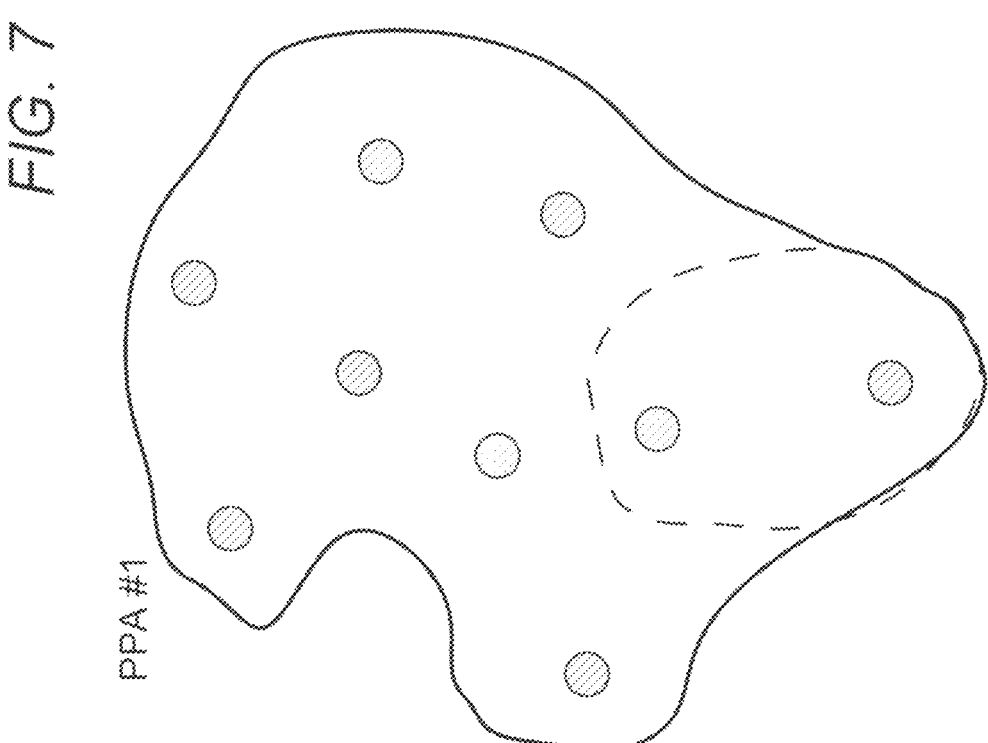

*FIG. 10*

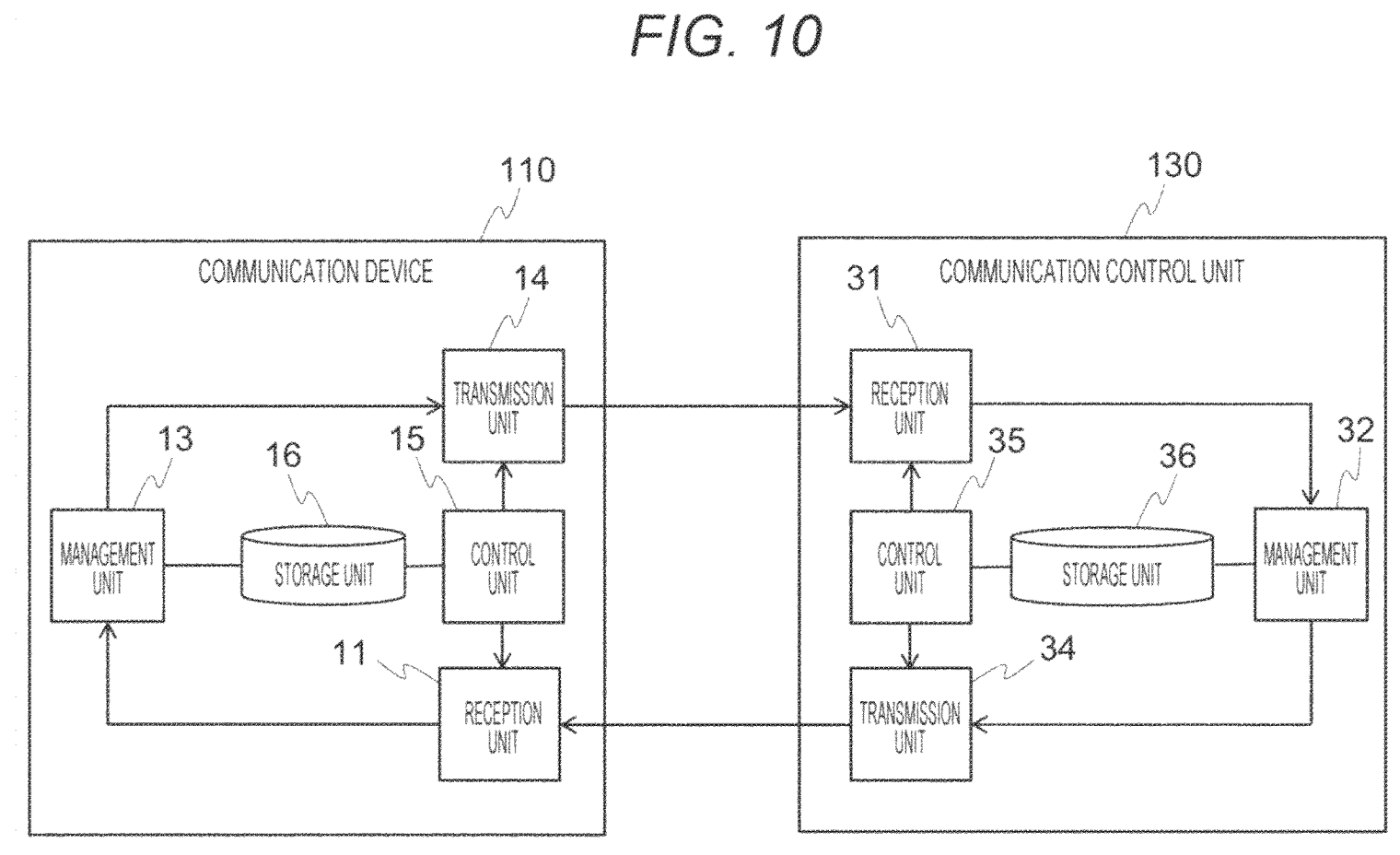

COMMUNICATION CONTROL UNIT 130

MANAGEMENT UNIT 32

RECEPTION UNIT 31

CONTROL UNIT 35

STORAGE UNIT 36

TRANSMISSION UNIT 34

COMMUNICATION DEVICE 110

TRANSMISSION UNIT 14

CONTROL UNIT 15

RECEPTION UNIT 11

STORAGE UNIT 16

MANAGEMENT UNIT 13

FIG. 16

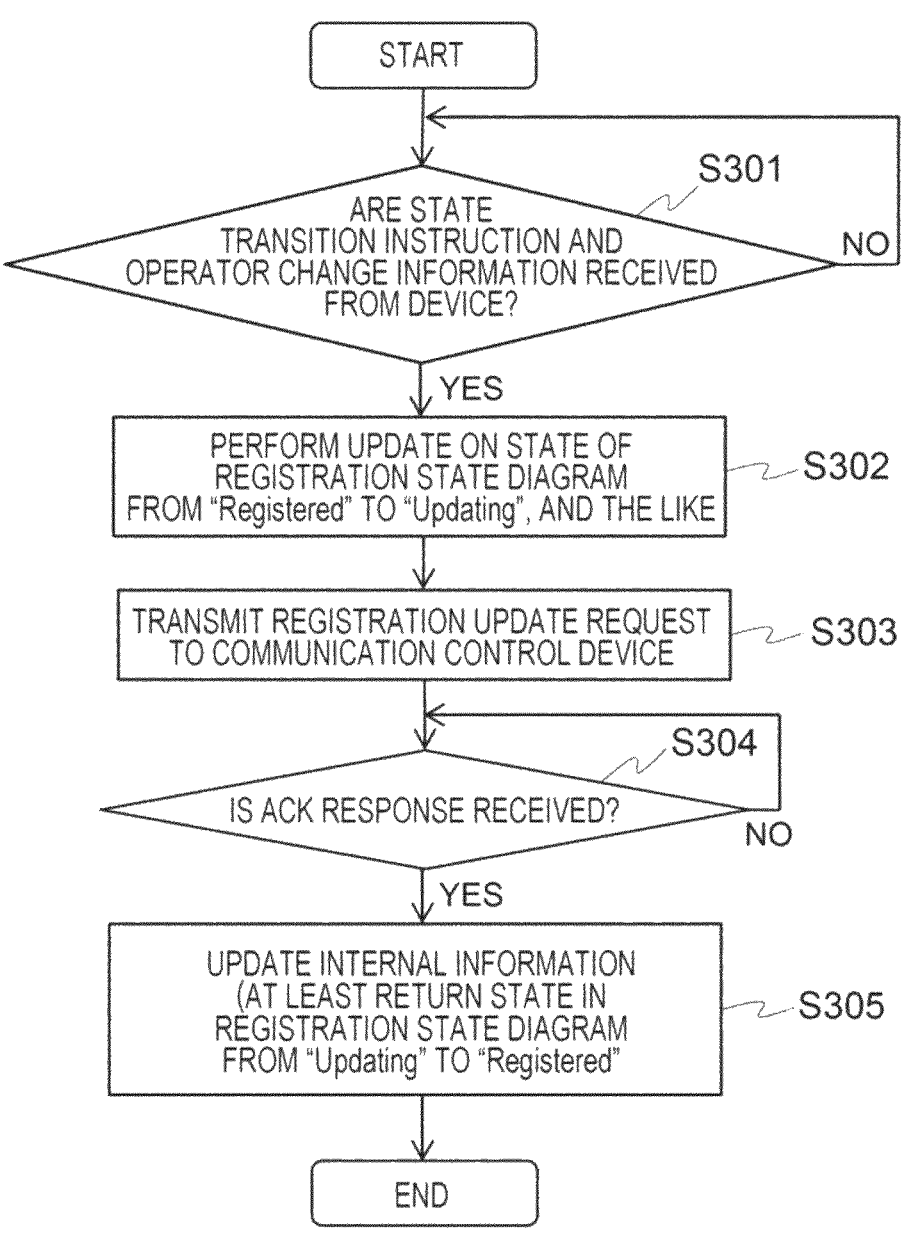

START

ARE STATE TRANSITION INSTRUCTION AND OPERATOR CHANGE INFORMATION RECEIVED FROM DEVICE?  — S301

NO

YES

PERFORM UPDATE ON STATE OF REGISTRATION STATE DIAGRAM FROM "Registered" TO "Updating", AND THE LIKE  — S302

TRANSMIT REGISTRATION UPDATE REQUEST TO COMMUNICATION CONTROL DEVICE  — S303

IS ACK RESPONSE RECEIVED?  — S304

NO

YES

UPDATE INTERNAL INFORMATION (AT LEAST RETURN STATE IN REGISTRATION STATE DIAGRAM FROM "Updating" TO "Registered"  — S305

END

COMMUNICATION CONTROL DEVICE, COMMUNICATION CONTROL METHOD, COMMUNICATION DEVICE, AND COMMUNICATION METHOD

REFERENCE TO RELATED APPLICATIONS

The present application is based on PCT filing PCT/JP2021/016199, filed Apr. 21, 2021, which claims priority to JP 2020-097177, filed Jun. 3, 2020, the entire contents of each are incorporated herein by reference.

TECHNICAL FIELD

The present disclosure relates to a communication control device, a communication control method, a communication device, and a communication method.

BACKGROUND ART

Due to an increase in a wireless environment in which various wireless systems are mixed, and enrichment of content provided via radio, a problem of exhaustion of radio wave resources (for example, frequencies) that can be allocated to wireless systems is coming to the surface. Therefore, as a means for squeezing necessary radio wave resources, "dynamic frequency sharing (dynamic spectrum access (DSA))" that makes good use of temporal and spatial emptiness (white spaces) among frequency bands that have been allocated to specific wireless systems is rapidly attracting attention.

CITATION LIST

Non-Patent Document

Non-Patent Document 1: WINNF-SSC-0004-V14.0.0 Spectrum Sharing Committee CBRS Release Plan [available at https://cbrs.wirelessinnovation.org/policies-and-procedures]
Non-Patent Document 2: Electronic Code of Federal Regulations, Title 47, Chapter I, Subchapter D, Part 96 Citizens Broadband Radio Service [available at https://www.ecfr.gov/cgi-bin/text-idx?node=pt47.5.96]
Non-Patent Document 3: Electronic Code of Federal Regulations, Title 47, Chapter I, Subchapter A, Part 1, Subpart X Spectrum Leasing [available at https://www.ecfr.gov/cgi-bin/text-idx?node=sp47.1.1.x]
Non-Patent Document 4: WINNF-TS-0061-V1.5.1 Test and Certification for Citizens Broadband Radio Service (CBRS); Conformance and Performance Test Technical Specification; SAS as Unit Under Test (UUT) [available at https://cbrs.wirelessinnovation.org/release-1-of-the-baseline-standard-specifications]

SUMMARY OF THE INVENTION

Problems to be Solved by the Invention

The Wireless Innovation Forum (WInnForum) Spectrum Sharing Committee (SSC), which is known as an organization for standardization regarding citizens broadband radio service (CBRS) (Non-Patent Document 2) in the United States, has revealed that discussion on Priority Access License (PAL) Secondary Market Support is currently in progress toward Release 2 (Non-Patent Document 1). In general, in the United States, frequency leasing (spectrum leasing) is allowed (Non-Patent Document 3), and the CBRS legal system also specifies in § 96.66 that a spectrum access system (SAS) may support leasing notifications separately specified.

As one of assumed businesses utilizing the PAL Secondary Market, conceivable is, for example, a service for integrally leasing a frequency band and an infrastructure (a communication device such as a base station). For example, it is assumed that a major mobile network operator (MNO) that holds a priority access license (PAL), which is a right to priority utilization of radio waves in a certain area, leases an infrastructure, in addition to a frequency band, to another operator (for example, a local operator who operates a wireless network only in a specific region or place) due to, for example, the significantly small number of customers of the MNO. For example, FIG. 19 illustrates an example in which each state is divided into areas of PALs on a state division map of the United States. It is assumed that in a certain area divided as described above, an MNO leases a frequency band and an infrastructure to another operator. Here, a network of an operator holding a PAL is protected from interference with other systems by a protection area referred to as a PAL protection area (PPA). In a case where an MNO leases a frequency band and an infrastructure to another operator, it is desirable that part or all of a PPA provided for the MNO is simply provided for the lessee operator and made effective. However, under the current mechanism, in order to provide the PPA to the lessee operator, it is necessary to newly obtain a permission (grant) for priority utilization of the frequency band for a communication device operated by the lessee operator. It takes some effort for the lessee operator, and it takes time to provide the PPA.

The present disclosure provides a communication control device, a communication control method, a communication device, and a communication method that implement a mechanism in which in a case where an operator leases a communication device to another operator, a permission for priority utilization of a frequency band does not need to be re-obtained.

Solutions to Problems

A communication control device of the present disclosure includes: a first reception unit that receives a registration update request to update operator information about an operator who operates a communication device permitted to perform priority utilization of a frequency band, from a first operator to a second operator; and a management unit that, on the basis of the registration update request, updates the operator information about an operator who operates the communication device, from the first operator to the second operator, and maintains the permission for priority utilization of the frequency band by the communication device.

A communication device of the present disclosure includes: a reception unit that receives operator change information that indicates that an operator who operates the communication device permitted by a communication control device to perform priority utilization of a frequency band is changed from a first operator to a second operator; and a transmission unit that, in a case where the operator change information is received, transmits, to the communication control device, a registration update request that requests to update operator information about an operator who operates the communication device, from the first operator to the second operator, and requests to maintain the permission for priority utilization of the frequency band by the communication device.

A communication device of the present disclosure includes: a transmission unit that transmits a leasing request that indicates that the communication device permitted by a communication control device to perform priority utilization of a frequency band is leased from a first operator to a second operator; and a reception unit that receives a first acknowledgement for the leasing request, in which in a case where the reception unit receives the first acknowledgement, the transmission unit transmits, to the communication control device, a registration update request that requests to update operator information about an operator who operates the communication device, from the first operator to the second operator, and requests to maintain the permission for priority utilization of the frequency band by the communication device.

A communication control method of the present disclosure is a communication control method executed by a communication control device, the communication control method including: receiving a registration update request to update operator information about an operator who operates a communication device permitted to perform priority utilization of a frequency band, from a first operator to a second operator; and on the basis of the registration update request, updating the operator information about an operator who operates the communication device, from the first operator to the second operator, and maintaining the permission for priority utilization of the frequency band by the communication device.

A communication method of the present disclosure is a communication method executed by a communication device, the communication method including: receiving operator change information that indicates that an operator who operates the communication device permitted by a communication control device to perform priority utilization of a frequency band is changed from a first operator to a second operator; and in a case where the operator change information is received, transmitting, to the communication control device, a registration update request that requests to update operator information about an operator who operates the communication device, from the first operator to the second operator, and requests to maintain the permission for priority utilization of the frequency band by the communication device.

A communication method of the present disclosure is a communication method executed by a communication device, the communication method including: transmitting a leasing request that notifies that the communication device permitted by a communication control device to perform priority utilization of a frequency band is leased from a first operator to a second operator; and in a case where a first acknowledgement for the leasing request is received, transmitting, to the communication control device, a registration update request that requests to update operator information about an operator who operates the communication device, from the first operator to the second operator, and requests to maintain the permission for priority utilization of the frequency band by the communication device.

BRIEF DESCRIPTION OF DRAWINGS

FIG. 5 is a diagram illustrating a three-tier structure in Citizens Broadband Radio Service (CBRS).

FIG. 6 is a diagram illustrating a flow of signaling between terminals.

FIG. 7 is a diagram illustrating priority access license protection area (PPA) examples.

FIG. 10 is a block diagram of a communication system according to an exemplary embodiment of the present disclosure.

FIG. 16 is a flowchart of an example of operation of the communication device according to an exemplary embodiment of the present disclosure.

MODE FOR CARRYING OUT THE INVENTION

Hereinafter, exemplary embodiments of the present disclosure will be described with reference to the drawings. In one or more exemplary embodiments shown in the present disclosure, the elements included in each exemplary embodiment can be combined with each other, and the combined result also forms part of the exemplary embodiment(s) shown in the present disclosure.

1. Assumable Representative Scenario

<1.1 System Model>

Figure 1:
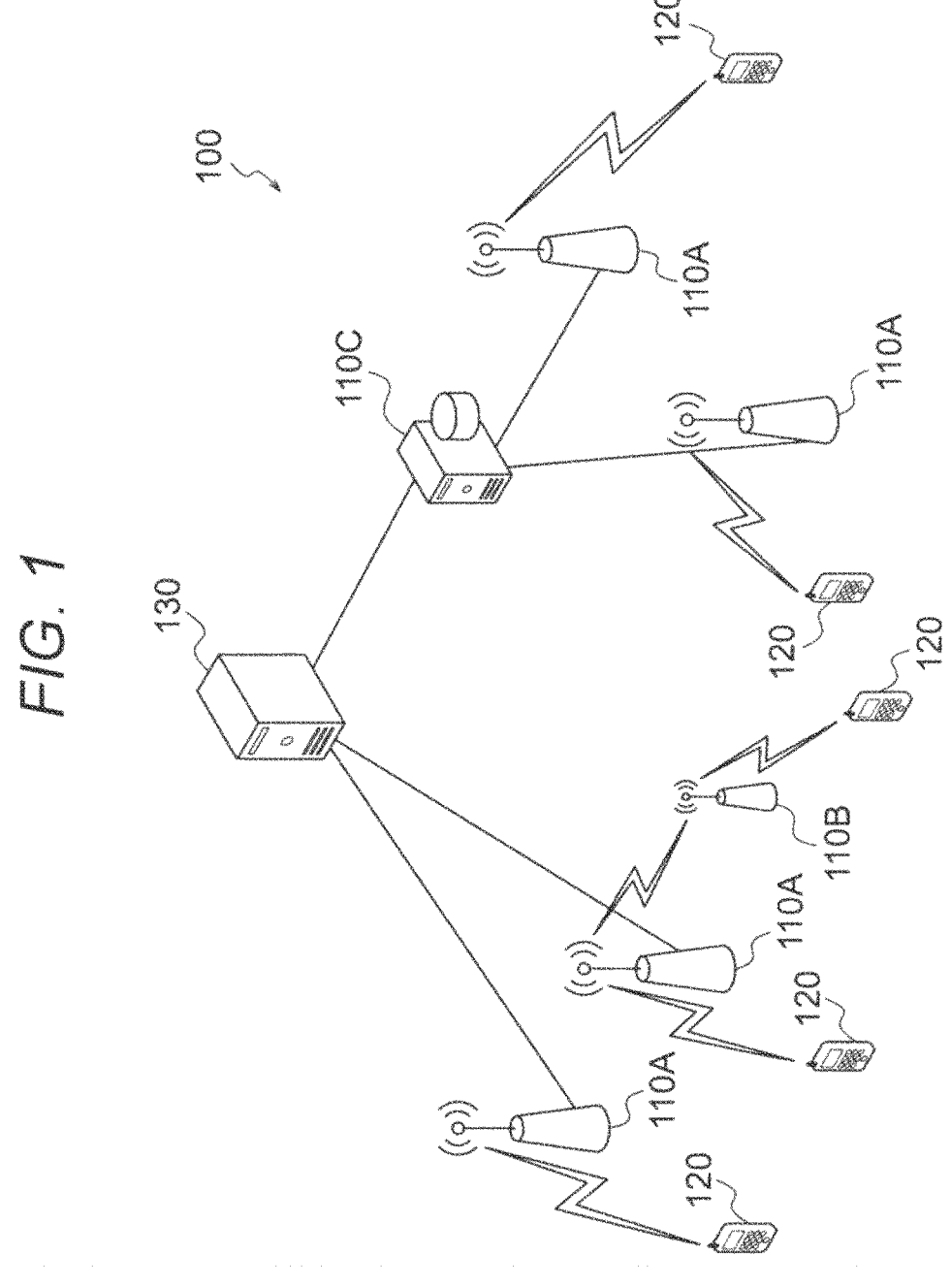
FIG. 1 is a diagram illustrating a system model according to an exemplary embodiment of the present disclosure.

FIG. 1 illustrates a system model according to an exemplary embodiment of the present invention. As illustrated in FIG. 1, the present system model is represented by a communication network 100 including wireless communication, and typically is constituted by the following entities.

Communication devices 110

Terminals 120

A communication control device 130

Furthermore, the present system model also includes at least a primary system and a secondary system utilizing the communication network 100. The primary system and the secondary system are constituted by the communication devices 110 or are constituted by the communication devices 110 and the terminals 120. Although various communication systems can be treated as the primary system or the secondary system, it is supposed that in the present exemplary embodiment, the primary system is a wireless system that uses a specific frequency band, and the secondary system is a wireless system that shares part or all of the frequency band. That is, the present system model will be described as a model of a wireless communication system regarding dynamic frequency sharing (dynamic spectrum access (DSA)) Note that the present system model is not limited to a system related to the dynamic frequency sharing.

Typically, the communication device 110 is a wireless device, such as a wireless base station (base station, Node B, eNB, gNB, or the like) or a wireless access point, that provides wireless communication service for the terminals 120. That is, the communication device 110 provides wireless communication service to enable wireless communication of the terminals 120. Furthermore, the communication device 110 may be a wireless relay device or an optical extension device referred to as a remote radio head (RRH). In the following description, unless otherwise noted, the communication devices 110 will be described as entities constituting the secondary system.

The coverage (communication zone) provided by the communication device 110 is allowed to have various sizes from a large size, such as a macrocell, to a small size, such as a picocell. Like a distributed antenna system (DAS), a plurality of the communication devices 110 may form one cell. Furthermore, in a case where the communication device 110 has a beamforming capability, a cell or a service area may be formed for every beam.

It is assumed that in the present disclosure, two different types of the communication devices 110 exist.

In the present disclosure, the communication device 110 that can access the communication control device 130 without utilizing a wireless path that needs permission of the communication control device 130 is referred to as a "communication device 110A". Specifically, for example, the communication device 110 capable of wired Internet connection can be regarded as the "communication device 110A". Furthermore, for example, even a wireless relay device that does not have a wired Internet connection function may also be regarded as the "communication device 110A" if a wireless backhaul link using a frequency that does not need permission of the communication control device 130 is constructed between the wireless relay device and another communication device 110A.

In the present disclosure, the communication device 110 that cannot access the communication control device 130 without a wireless path that needs permission of the communication control device 130 is referred to as a "communication device 110B". For example, a wireless relay device that needs to construct a backhaul link using a frequency that needs permission of the communication control device 130 can be regarded as the "communication device 110B". Furthermore, for example, a device, such as a smartphone furnished with a wireless network provision function represented by tethering, that uses a frequency that needs permission of the communication control device 130 in both a backhaul link and an access link may also be treated as the "communication device 110B".

The communication device 110 does not necessarily need to be fixedly installed. For example, the communication device 110 may be installed in a moving object, such as an automobile. Furthermore, the communication device 110 does not necessarily need to exist on the ground. For example, an object existing in the air or outer space, such as an aircraft, a drone, a helicopter, a high altitude platform station (HAPS), a balloon, a satellite, or the like, may be furnished with the communication device 110. Furthermore, for example, an object existing on the sea or under the sea, such as a ship, a submarine, or the like, may be furnished with the communication device 110. Typically, such a mobile communication device 110 corresponds to the communication device 110B, and performs wireless communication with the communication device 110A to secure an access path to the communication control device 130. As a matter of course, even a mobile communication device 110 can be treated as the communication device 110A as long as a frequency used in wireless communication with the communication device 110A is out of a management target of the communication control device 130.

In the present disclosure, unless otherwise specified, the description "communication device 110" includes both meanings of the communication device 110A and the communication device 110B, and may be substituted and read as either one.

The communication devices 110 may be utilized, operated, or managed by various operators. For example, a mobile network operator (MNO), a mobile virtual network operator (MVNO), a mobile network enabler (MNE), a mobile virtual network enabler (MVNE), a shared equipment operator, a neutral host network (NHN) operator, a broadcasting operator, an enterprise, an educational institution (an educational corporation, a board of education of each self-governing body, or the like), a real estate (a building, an apartment, or the like) manager, an individual, or the like may be assumed as an operator related to the communication devices 110. Note that an operator related to the communication devices 110 is not particularly limited. Furthermore, the communication devices 110A may be a shared equipment utilized by a plurality of operators. Furthermore, different operators may perform installation and utilization, operation, and management of the equipment, respectively.

The communication devices 110 operated by an operator are typically connected to the Internet via a core network. Furthermore, operation, management, and maintenance are performed by a function referred to as Operation, Administration & Maintenance (OA & M). Furthermore, for example, as illustrated in FIG. 1, an intermediate device (network manager) 110C may exist to synthetically control the communication devices 110 in a network. Note that the intermediate device may be the communication device 110 or may be the communication control device 130.

The terminals 120 (user equipment, user terminals, user stations, mobile terminals, mobile stations, or the like) are devices that perform wireless communication by wireless communication service provided by the communication devices 110. Typically, communication apparatuses, such as smartphones, correspond to the terminals 120. Note that a device furnished with a wireless communication function may correspond to the terminal 120. For example, an apparatus, such as a business camera having a wireless communication function, may also correspond to the terminal 120 even if the wireless communication is not a main application. Furthermore, a communication apparatus that transmits data to the terminal 120, such as a broadcasting wireless station (field pickup unit (FPU)) that transmits images and the like for television broadcasting from outside a broadcasting station (spot) to the broadcasting station in order to perform sports relay, also corresponds to the terminal 120. Furthermore, the terminal 120 does not necessarily need to be utilized by a person. For example, like what is called machine type communication (MTC), an apparatus, such as a factory machine or a sensor installed in a building, may be network-connected to operate as the terminal 120. Furthermore, an apparatus referred to as customer premises equipment (CPE) provided to secure Internet connection may behave as the terminal 120.

Furthermore, as represented by device-to-device (D2D) and vehicle-to-everything (V2X), the terminal 120 may be furnished with a relay communication function.

Furthermore, similarly to the communication device 110, the terminal 120 does not need to be fixedly installed or exist on the ground. For example, an object existing in the air or outer space, such as an aircraft, a drone, a helicopter, a satellite, or the like, may operate as the terminal 120. Furthermore, for example, an object existing on the sea or under the sea, such as a ship, a submarine, or the like, may operate as the terminal 120.

In the present disclosure, unless otherwise noted, the terminal 120 corresponds to an entity that terminates a wireless link using a frequency that needs permission of the communication control device 130. However, depending on a function with which the terminal 120 is furnished or an applied network topology, the terminal 120 may perform an operation equivalent to the operation of the communication device 110. In other words, depending on a network topology, a device that may correspond to the communication device 110, such as a wireless access point, may correspond to the terminal 120, or a device that may correspond to the terminal 120, such as a smartphone, may correspond to the communication device 110.

The communication control device 130 is typically a device that performs determination, utilization permission, instructions, and/or management of communication parameters of the communication device 110. For example, a database server referred to as a television (TV) white space database (TVWSDB), a geolocation database (GLDB), a spectrum access system (SAS), or automated frequency coordination (AFC) corresponds to the communication control device 130. Furthermore, for example, a control device that performs radio wave interference control between devices, and is specified by standards represented by EN 303 387 of European Telecommunications Standards Institute (ETSI), the Institute of Electrical and Electronics Engineers (IEEE) 802.19.1-2018, CBRSA-TS-2001, or the like also corresponds to the communication control device 130. Furthermore, for example, a registered location secure server (RLSS) specified in IEEE 802.11-2016 also corresponds to the communication control device 130. That is, these examples are not limiting, and an entity responsible for determination, utilization permission, instructions, management, and the like of communication parameters of the communication device 110 may be referred to as the communication control device 130. Basically, the control targets of the communication control device 130 are the communication devices 110, but the communication control device 130 may control the terminals 120 under the control of the communication devices 110.

A plurality of the communication control devices 130 may exist. In a case where a plurality of the communication control devices 130 exists, at least one of at least the following three types of decision-making topologies may be applied to the communication control devices 130.

Autonomous decision-making

Centralized decision-making

Distributed decision-making

Figure 2:
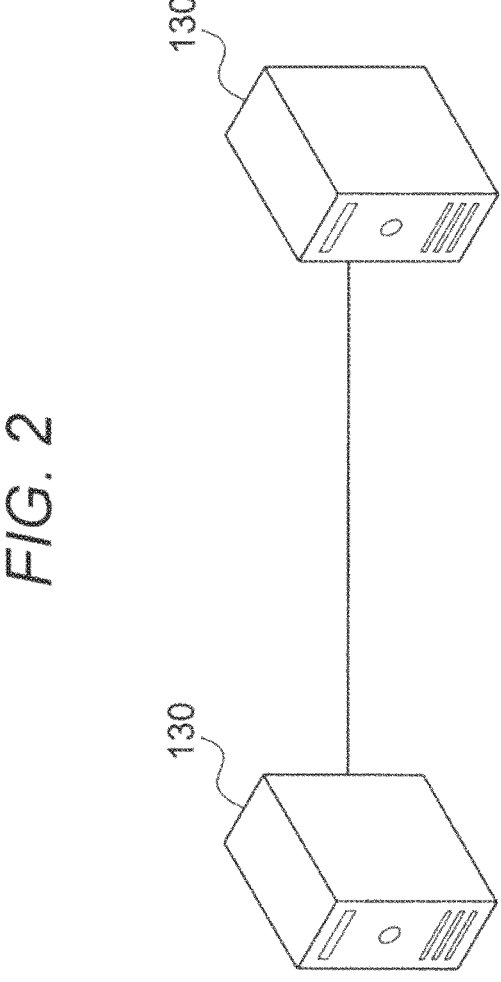
FIG. 2 is a diagram illustrating a network configuration to which autonomous decision-making may be applied.

The autonomous decision-making is a decision-making topology in which an entity that makes a decision (decision-making entity, here, the communication control device 130) makes a decision independently from another decision-making entity. The communication control device 130 independently performs necessary frequency allocation and interference control calculation. For example, in a case where a plurality of the communication control devices 130 is arranged in a distributed manner as illustrated in FIG. 2, the autonomous decision-making may be applied.

Figure 3:
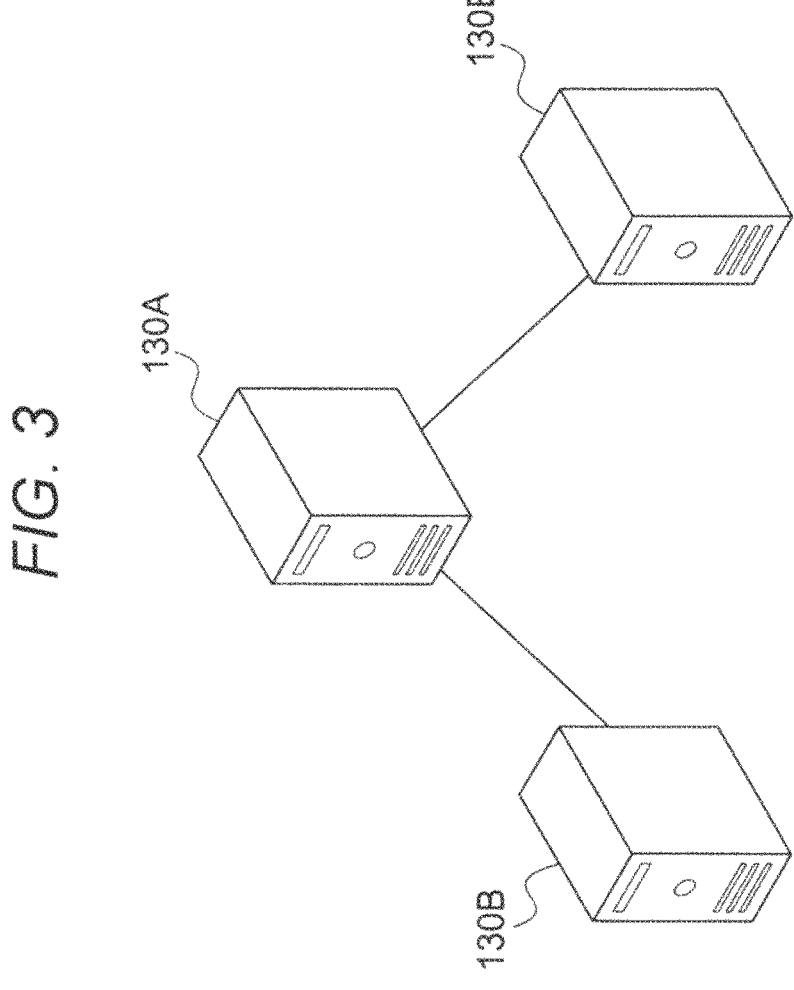
FIG. 3 is a diagram illustrating a network configuration to which centralized decision-making may be applied.

The centralized decision-making is a decision-making topology in which a decision-making entity entrusts decision making to another decision-making entity. In a case where the centralized decision-making is performed, a model as in FIG. 3 is assumed, for example. FIG. 3 illustrates a model (what is called a master/slave type) in which one communication control device 130 centrally unifies a plurality of communication control devices 130. In the model in FIG. 3, a communication control device 130A, which is a master, can unify communication control devices 130B, which are a plurality of slaves, to make decisions in a centralized manner.

The distributed decision-making is a decision-making topology in which a decision-making entity makes a decision in liaison with another decision-making entity. For example, mutual adjustment, negotiation, and the like of decision-making results performed by each of a plurality of the communication control devices 130 after the communication control devices 130 independently make decisions as in the autonomous decision-making in FIG. 2 may correspond to the "distributed decision-making". Furthermore, it can also be regarded as the "distributed decision-making" that for example, in the centralized decision-making in FIG. 3, the communication control device 130A as a master dynamically performs delegation, discard, or the like of a decision-making authority for each of the communication control devices 130B as slaves for the purpose of load balancing or the like.

Figure 4:
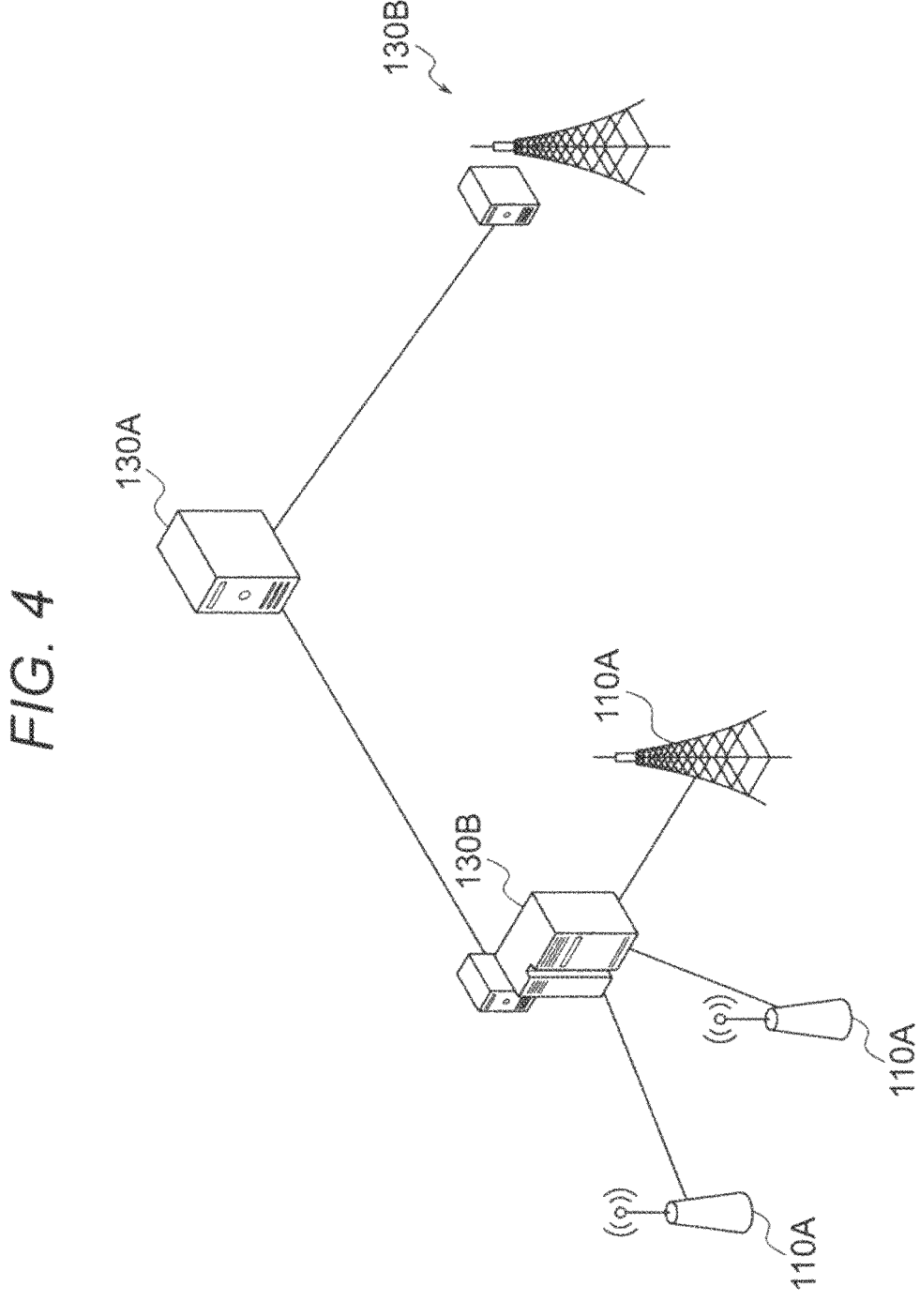
FIG. 4 is a diagram illustrating a network configuration in a case where both centralized decision-making and distributed decision-making are applied.

Both the centralized decision-making and the distributed decision-making may be applied. In FIG. 4, a communication control device 130B as a slave operates as an intermediate device that puts a plurality of communication devices 110 together. A communication control device 130A as a master may not control the communication devices 110 put together by the communication control device 130B as a slave, that is, a secondary system constituted by the communication control device 130B as a slave. As described above, implementation as illustrated in FIG. 4 is also possible as a modification.

For a role of the communication control device 130, the communication control device 130 may also acquire necessary information from other entities than the communication devices 110 and the terminals 120 of the communication network 100. Specifically, for example, information necessary for protecting the primary system may be acquired from a database (regulatory database) managed or operated by a radio wave administrative agency (national regulatory authority (NRA)) of a country or a region. One example of the regulatory database is Universal Licensing System (ULS) operated by the United States Federal Communications Commissions (FCC), or the like. Examples of information necessary for protecting the primary system include, for example, primary system position information, primary system communication parameters, an out-of-band emission (OOBE) limit, an adjacent channel leakage ratio (ACLR), an adjacent channel selectivity, a fade margin, a protection ratio (PR), and the like. In a region where fixed numerical values, acquisition methods, derivation methods, and the like are defined by a legal system or the like in order to protect the primary system, it is desirable to use information defined by the legal system, as information necessary for protecting the primary system.

Furthermore, a database that records the communication devices 110 and the terminals 120 that have been subjected to conformity approval, such as Equipment Authorization System (EAS) managed by the Office of Engineering and Technology (OET) of the FCC, also corresponds to the regulatory database. From such a regulatory database, information regarding operable frequencies of the communication devices 110 and the terminals 120, information regarding the maximum equivalent isotropic radiated power (EIRP), and the like can be acquired. Naturally, the communication control device 130 may use these pieces of information to protect the primary system.

Furthermore, it is also assumable that the communication control device 130 acquires radio wave sensing information from a radio wave sensing system installed and operated for the purpose of detection of radio wave of the primary system. As a specific example, in Citizens Broadband Radio Service (CBRS) of the United States, the communication control device 130 acquires radio wave detection information about a marine radar as the primary system from a radio wave sensing system referred to as Environmental Sensing Capability (ESC). Furthermore, in a case where the communication device 110 and the terminal 120 are furnished with sensing functions, the communication control device 130 may acquire radio wave detection information about the primary system from the communication device 110 and the terminal 120.

The interface between each of the entities constituting the present system model may be either wired or wireless. For example, not only a wired line but also a wireless interface that does not depend on frequency sharing may be utilized as an interface between the communication control device 130 and the communication device 110. As examples of the wireless interface that does not depend on frequency sharing, a wireless communication line provided by a mobile network operator via a licensed band, Wi-Fi communication utilizing an incumbent license-exempt band, and the like exist.

<1.2 Terms regarding Frequency and Sharing>

As described above, the present exemplary embodiment will be described assuming a dynamic frequency sharing (dynamic spectrum access) environment. As a representative example of the dynamic frequency sharing, a mechanism defined in the CBRS of the United States (that is, a mechanism defined in Part 96 of the FCC Rules of the United States, Citizens Broadband Radio Service) will be described.

In the CBRS, as illustrated in FIG. 5, each of shared frequency band users is classified into one of three groups. This group is referred to as a tier. The three groups are referred to as an Incumbent Tier, a Priority Access Tier, and a General Authorized Access (GAA) Tier, respectively.

The Incumbent Tier is a group including incumbent users who conventionally utilize a frequency band defined as the shared frequency band. The incumbent users are also generally referred to as primary users. In the CBRS, the Department of Defense (DOD) of the United States, fixed satellite operators, and a new rule application excepted wireless broadband licensee (Grandfathered Wireless Broadband Licensee (GWBL)) are defined as the incumbent users. The Incumbent Tier is not requested to avoid interference with the Priority Access Tier and the GAA tier having lower priorities or to restrict utilization of the shared frequency band. Furthermore, the Incumbent Tier is protected from the interference by the Priority Access Tier and the GAA Tier. That is, the users of the Incumbent Tier can use the shared frequency band without considering the existence of the other groups.

The Priority Access Tier is a group of users who utilize the shared frequency band on the basis of the above-described Priority Access License (PAL). A user of the Priority Access Tier is also generally referred to as a secondary user. When utilizing the shared frequency band, the Priority Access Tier is requested to avoid interference and to restrict the utilization of the shared frequency band, for the Incumbent Tier having a priority higher than the priority of the Priority Access Tier. On the other hand, the Priority Access Tier is not requested to avoid interference and to restrict the utilization of the shared frequency band, for the GAA Tier having a priority lower than the priority of the Priority Access Tier. Furthermore, the Priority Access Tier is not protected from the interference by the Incumbent Tier having a higher priority, but is protected from the interference by the GAA Tier having a lower priority.

The GAA Tier is a group including shared frequency band users who do not belong to the Incumbent Tier and the Priority Access Tier. Similarly to the Priority Access Tier, a GAA Tier user is also generally referred to as a secondary user. However, since the shared utilization priority is lower than the shared utilization priority of the Priority Access Tier, the GAA Tier is also referred to as a low-priority secondary user. When utilizing the shared frequency band, the GAA Tier is requested to avoid interference and to restrict the utilization of the shared frequency band, for the Incumbent Tier and the Priority Access Tier having higher priorities. Furthermore, the GAA Tier is not protected from the interference by the Incumbent Tier and the Priority Access Tier having higher priorities. That is, regarding the legal system, the GAA Tier is a tier from which an opportunistic shared frequency band utilization is requested.

Although the CBRS mechanism has been described above as a representative example of the dynamic frequency sharing, the present exemplary embodiment is not limited to the definition of the CBRS. For example, as illustrated in FIG. 5, the CBRS generally adopts a three-tier structure, but a two-tier structure may be adopted in the present exemplary embodiment. Representative examples of the two-tier structure include Authorized Shared Access (ASA), Licensed Shared Access (LSA), evolved LSA (eLSA), TV band White Space (TVWS) and the like. In the ASA, the LSA, and the eLSA, there is no GAA tier, and a structure equivalent to a combination of the Incumbent Tier and the Priority Access Tier is adopted. Furthermore, in the TVWS, there is no Priority Access Tier, and a structure equivalent to a combination of the Incumbent Tier and the GAA Tier is adopted. Furthermore, four or more Tiers may exist. Specifically, for example, four or more Tiers may be generated by providing a plurality of intermediate tiers corresponding to the Priority Access Tier, giving different priorities to each of the intermediate tiers, and the like. Furthermore, for example, the Tiers may be increased by similarly dividing the GAA Tier, giving priorities, and the like. That is, each of the groups may be divided.

Furthermore, the primary system of the present exemplary embodiment is not limited to the definition of the CBRS. For example, as examples of the primary system, wireless systems, such as TV broadcasting, a fixed microwave line (fixed system (FS)), a weather radar (meteorological radar), a radio altimeter, a wireless train control system (communications-based train control), and radio astronomy, are assumed. Furthermore, the examples are not limiting, and any wireless system may be the primary system of the present exemplary embodiment.

Furthermore, as described above, the present exemplary embodiment is not limited to a frequency sharing environment. In general, in frequency sharing or secondary frequency utilization, an incumbent system that utilizes a target frequency band is referred to as a primary system, and a secondary utilizer is referred to as a secondary system. However, in a case where the present exemplary embodiment is applied to other environments than a frequency sharing environment, the primary system and the secondary system should be replaced with other terms to be read. For example, a macrocell base station in a heterogeneous network (HetNet) may be a primary system, and a small-cell base station or a relay station may be a secondary system. Furthermore, a base station may be a primary system, and a relay user equipment (UE) and a vehicle UE that exist in a coverage of the base station and implement D2D and V2X and may be a secondary system. A base station is not limited to a fixed type, and may be a portable type or a mobile type. In such a case, for example, a core network, a base station, a relay station, a relay UE, or the like may be furnished with the communication control device 130 of the present exemplary embodiment.

Furthermore, in a case where the present exemplary embodiment is applied to other environments than the frequency sharing environment, the term "frequency" in the present disclosure is replaced with another term shared in the application destination. For example, it is assumed that the term "frequency" is replaced with terms, such as "resource", "resource block", "resource element", "resource pool", "channel", "component carrier", "carrier", "subcarrier", and "bandwidth part (BWP)", and other terms having meanings equivalent or similar to the terms.

2. Description of Various Procedures Assumed in Present Exemplary Embodiment

Here, basic procedures that can be used at the time of the implementation of the present exemplary embodiment will be described. Note that up to <2.5> described later, the description will be made on the assumption that the basic procedures are mainly performed in the communication device 110A.

<2.1 Registration Procedure>

A registration procedure is a procedure for registering information about a wireless system that intends to utilize a shared frequency band. Specifically, the registration procedure is a procedure for registering, in the communication control device 130, device parameters regarding the communication device 110 of the wireless system. Typically, the registration procedure is started by the communication device 110 that represents the wireless system that intends to utilize the shared frequency band notifying the communication control device 130 of a registration request that includes device parameters. Note that, in a case where a plurality of the communication devices 110 belongs to the wireless system that intends to utilize the shared frequency band, device parameters of each of the plurality of communication devices is included in the registration request.

Furthermore, a device that transmits a registration request as a representative of the wireless system may be appropriately defined.

<2.1.1 Details of Required Parameters>

The device parameters refer to, for example, the following information.

Information regarding the user of the communication device 110 (hereinafter described as utilizer information)

Information unique to the communication device 110 (hereinafter described as unique information)

Information regarding the position of the communication device 110 (hereinafter described as position information)

Information regarding an antenna included by the communication device 110 (hereinafter described as antenna information)

Information regarding a wireless interface included by the communication device 110 (hereinafter described as wireless interface information)

Legal information regarding the communication device 110 (hereinafter described as legal information)

Information regarding the installer of the communication device 110 (hereinafter described as installer information)

Information regarding the group to which the communication device 110 belongs (hereinafter group information)

The device parameters are not limited to the above. Other Information than these pieces of information may be treated as the device parameters. Note that the device parameters do not need to be transmitted once, and a plurality of portions of the device parameters may be separately transmitted. That is, a plurality of registration requests may be transmitted for one registration procedure. In this manner, a plurality of portions of one procedure or one piece of processing in one procedure may be separately performed. The procedure described below is also similar.

The utilizer information is information related to the utilizer of the communication device 110. For example, a utilizer ID, an account name, a utilizer name, a utilizer contact information, a call sign, and the like may be assumed. The utilizer ID and the account name may be independently generated by the utilizer of the communication device 110 or may be issued by the communication control device 130 in advance. As the call sign, it is desirable to use a call sign issued by an NRA.

The utilizer information may be used, for example, for an application of interference resolution. As a specific example, in a frequency utilization notification procedure described in <2.5> to be described later, even if the communication control device 130 makes a utilization stop determination for a frequency being used by the communication device 110 and gives instructions based on the utilization stop determination, there may be a case where notification of a frequency utilization notification request for the frequency is continuously provided. In this case, the communication control device 130 can suspect a failure of the communication device 110, and contact the utilizer contact information included in the utilizer information to ask the confirmation of the behavior of the communication device 110. This example is not limiting, and in a case where it is determined that the communication device 110 is performing an operation against communication control performed by the communication control device 130, the communication control device 130 can make contact using the utilizer information.

The unique information is information that can specify the communication device 110, product information about the communication device 110, information regarding hardware or software of the communication device 110, and the like.

The information that can specify the communication device 110 may include, for example, the manufacturing number (serial number) of the communication device 110, the ID of the communication device 110, and the like. The ID of the communication device 110 may be, for example, independently given by the utilizer of the communication device 110.

The product information about the communication device 110 may include, for example, an approval ID, a product model number, information regarding the manufacturer, and the like. The approval ID is, for example, an ID given from an approval agency in each country or region, such as an FCC ID of the United States, a CE number in Europe, a Technical Registrations Conformity Certificate (Technical Conformity) in Japan, or the like. An ID issued by an industry association or the like on the basis of an independent approval program may also be regarded as the approval ID.

The unique information represented by these examples may be used, for example, in applications of a whitelist or a blacklist. For example, in a case where any piece of information regarding a communication device 110 in operation is included in the blacklist, the communication control device 130 can instruct the communication device 110 in question to stop utilizing the frequency in a frequency utilization notification procedure described in <2.5> described later. Moreover, the communication control device 130 can take a behavior, such as not canceling the utilization stop measure until the communication device 110 in question is cancelled from the blacklist. Furthermore, for example, the communication control device 130 can reject registration of a communication device 110 included in the blacklist. Furthermore, for example, the communication control device 130 can also perform an operation, such as not considering, in an interference calculation of the present disclosure, a communication device 110 corresponding to information included in the blacklist, or considering, in an interference calculation, only communication devices 110 corresponding to information included in the whitelist.

The information regarding hardware of the communication device 110 may include, for example, transmission power class information. For example, in the FCC Code of Federal Regulations (C.F.R.) Part 96 of the United States, two types of classes, Category A and Category B, are specified as the transmission power class information, and the information regarding hardware of the communication device 110 conforming to the specification may include information about which of the two types of classes the communication device 110 belongs to. Furthermore, in Technical Specification (TS) 36.104 and TS 38.104 of the 3rd Generation Partnership Project (3GPP), some classes of eNodeB and gNodeB are specified, and these specifications may also be used.

The transmission power class information may be used, for example, in applications of interference calculation. The interference calculation can be performed using the maximum transmission power specified for every class, as the transmission power of the communication device 110.

The information regarding software of the communication device 110 may include, for example, version information, a build number, and the like regarding an executable program in which processing necessary for interaction with the communication control device 130 is described. Furthermore, version information, a build number, and the like of software for operating as the communication device 110 may also be included.

The position information is typically information that can specify the position of the communication device 110. The position information is, for example, coordinate information acquired by a positioning function represented by the Global Positioning System (GPS), the Beidou, the Quasi-Zenith Satellite System (QZSS), Galileo, and an Assisted Global Positioning System (A-GPS). Typically, information related to latitude, longitude, height above ground/sea level, altitude, and positioning error may be included. Alternatively, the position information may be, for example, position information registered in an information management device managed by a national regulatory authority (NRA) or an agency of the NRA. Alternatively, the position information may be, for example, coordinates of an X axis, a Y axis, and a Z axis with a specific geographical position as an origin. Furthermore, together with such coordinate information, an identifier indicating whether the communication device 110 exists outdoors or indoors may be given.

Furthermore, the position information may be information indicating a zone in which the communication device 110 is located. For example, information indicating a zone defined by an administration, such as a postal code or an address, may be used. Furthermore, for example, a zone may be indicated by a set of three or more geographical coordinates. These pieces of information indicating a zone may be provided together with the coordinate information.

Furthermore, in a case where the communication device 110 is located indoors, information indicating a floor of a building where the communication device 110 is located may also be included in the position information. For example, an identifier indicating the floor number, the overground, or the underground, and the like may be included in the position information. Furthermore, for example, information indicating a further closed indoor space, such as a room number or a room name in a building, may be included in the position information.

Typically, the communication device 110 is desirably furnished with a positioning function. However, the performance of the positioning function may not satisfy a requested precision. Furthermore, even if the performance of the positioning function satisfies a requested precision, position information that satisfies the requested precision may not necessarily be acquired depending on the installation position of the communication device 110. Therefore, a device different from the communication device 110 may be furnished a positioning function, and the communication device 110 may acquire information related to the position from the device. The device having a positioning function may be an available incumbent device, but may be provided by the installer of the communication device 110. In such a case, it is desirable that the position information measured by the installer of the communication device 110 is written in the communication device 110.

The antenna information is typically information indicating the performance, configuration, and the like of an antenna with which the communication device 110 is furnished. Typically, information, such as an antenna installation height, a tilt angle (downtilt), a horizontal orientation (azimuth), a boresight, an antenna peak gain, and an antenna model, may be included.

Furthermore, the antenna information may also include information regarding formable beams. For example, information, such as a beam width, a beam pattern, and an analog or digital beam forming capability, may be included.

Furthermore, the antenna information may also include information regarding the performance and configuration of multiple input multiple output (MIMO) communication. For example, information, such as the number of antenna elements and the maximum number of spatial streams, may be included. Furthermore, codebook information to be used, weight matrix information, and the like may also be included. The weight matrix information includes a unitary matrix, a zero-forcing (ZF) matrix, a minimum mean square error (MMSE) matrix, and the like, which are obtained by singular value decomposition (SVD), eigen value decomposition (EVD), block diagonalization (BD), and the like. Furthermore, in a case where the communication device 110 is furnished with a function that needs nonlinear operations, such as maximum likelihood detection (MLD), information indicating the furnished function may also be included in the antenna information.

Furthermore, the antenna information may also include Zenith of Direction, Departure (ZoD). ZoD is a type of radio wave arrival angle. Note that, instead of being provided in notification from the communication device 110, the ZoD may be estimated from radio waves radiated from the antenna of the communication device 110 and provided in notification by another communication device 110. In this case, the communication device 110 may be a device that operates as a base station or an access point, a device that performs D2D communication, a moving relay base station, or the like. The ZoD may be estimated by a radio wave arrival direction estimation technology, such as multiple signal classification (MUSIC) or estimation of signal propagation via rotation invariance techniques (ESPRIT). Furthermore, the ZoD may be used by the communication control device 130 as measurement information.

The wireless interface information is typically information indicating the wireless interface technology with which the communication device 110 is furnished. For example, identifier information indicating a technology used in the Global System for Mobile Communications (GSM), code-division multiple access 2000 (CDMA2000), the Universal Mobile Telecommunications System (UMTS), Evolved Universal Terrestrial Radio Access (E-UTRA), E-UTRA Narrow Band IoT (NB-IoT), fifth generation New Radio (5G NR), 5G NR NB-IoT, or a further next generation cellular system may be included as the wireless interface information. Furthermore, identifier information indicating a derivative technology conforming to Long Term Evolution (LTE)/5G, such as MulteFire, Long Term Evolution-Unlicensed (LTE-U), or NR-Unlicensed (NR-U), may also be included. Furthermore, identifier information indicating a standard technology, such as a metropolitan area network (MAN), such as Worldwide Interoperability for Microwave Access (WiMAX) or WiMAX2+, or a wireless local area network (LAN) of the IEEE 802.11 series, may also be included. Furthermore, identifier information indicating Extended Global Platform (XGP) or shared XGP (sXGP) may also be possible. Identifier information about a communications technology for Local Power, Wide Area (LPWA) may also be possible. Furthermore, identifier information indicating a proprietary wireless technology may also be included. Furthermore, a version number or a release number of a technology specifications that define these technologies may also be included as the wireless interface information.

Furthermore, the wireless interface information may also include frequency band information supported by the communication device 110. For example, the frequency band information may be represented by an upper limit frequency, a lower limit frequency, a center frequency, a bandwidth, a 3GPP operating band number, or a combination of at least two of the upper limit frequency, the lower limit frequency, the center frequency, the bandwidth, or the 3GPP operating band number. Furthermore, one or more pieces of frequency band information may be included in the wireless interface information.

The frequency band information supported by the communication device 110 may further include information indicating capability of a band extension technology, such as carrier aggregation (CA) or channel bonding. For example, combinable band information or the like may be included. Furthermore, as to the carrier aggregation, information regarding a band to be utilized as a primary component carrier (PCC) or a secondary component carrier (SCC) may also be included. Furthermore, the number of component carriers (the number of CCs) that can be aggregated at the same time may also be included.

The frequency band information supported by the communication device 110 may further include information indicating a combination of frequency bands supported by dual connectivity and multi connectivity. In addition, information about another communication device 110 that cooperatively provides the dual connectivity and the multi connectivity may also be provided. In the subsequent procedures, the communication control device 130 may add another communication device 110 having a cooperative relationship or the like to determine the communication control disclosed in the present exemplary embodiment.

The frequency band information supported by the communication device 110 may also include information indicating a radio wave utilization priority, such as a Priority Access License (PAL) and a General Authorized Access (GAA).

Furthermore, the wireless interface information may also include modulation scheme information supported by the communication device 110. For example, as a representative example, information indicating a primary modulation scheme, such as frequency shift keying (FSK), n-value phase shift keying (PSK where n is a multiplier of 2, such as 2, 4, 8), and n-value quadrature amplitude modulation (QAM where n is a multiplier of 4, such as 4, 16, 64, 256, 1024) may be included. Furthermore, information indicating a secondary modulation scheme, such as orthogonal frequency division multiplexing (OFDM), scalable OFDM, discrete Fourier transform spread OFDM (DFT-s-OFDM), generalized frequency division multiplexing (GFDM), or filter bank multi carrier (FBMC), may be included.

Furthermore, the wireless interface information may also include information regarding an error correction code. For example, a capability, such as a turbo code, a low density parity check (LDPC) code, a polar code, or an erasure correction code, and coding rate information to be applied may be included.

The modulation scheme information and the information regarding the error correction code may also be expressed by a modulation and coding scheme (MCS) index as another aspect.

Furthermore, the wireless interface information may also include information indicating a function peculiar to each wireless technology specification supported by the communication device 110. For example, as a representative example, Transmission Mode (TM) information specified in LTE is exemplified. In addition, the one having two or more modes regarding a specific function may also be included in the wireless interface information, such as the TM information. Furthermore, in a case where the communication device 110 supports a function that is not essential in the technology specification even if two or more modes do not exist in the specification, information indicating the supported function may also be included.

Furthermore, the wireless interface information may also include wireless access scheme (radio access technology (RAT)) information supported by the communication device 110. For example, information indicating time division multiple access (TDMA), frequency division multiple access (FDMA), orthogonal frequency division multiple access (OFDMA), power division multiple access (PDMA), code division multiple access (CDMA), sparse code multiple access (SCMA), interleave division multiple access (IDMA), spatial division multiple access (SDMA), carrier sense multiple access/collision avoidance (CSMA/CA), carrier sense multiple access/collision detection (CSMA/CD), or the like, may be included. Note that TDMA, FDMA, and OFDMA are classified into an orthogonal multiple access scheme (orthogonal multiple access (OMA)). PDMA, CDMA, SCMA, IDMA, and SDMA are classified into a non orthogonal multiple access scheme (non orthogonal multiple access (NOMA)). A representative example of PDMA is a technique implemented by a combination of superposition coding (SPC) and successive interference canceller (SIC). CSMA/CA and CSMA/CD are classified into an opportunistic access scheme (opportunistic access).

In a case where the wireless interface information includes information indicating an opportunistic access scheme, information indicating details of the access scheme may be further included. As a specific example, information indicating either frame based equipment (FBE) or load based equipment (LBE) defined in EN 301 598 of ETSI may be included.

In a case where the wireless interface information indicates the LBE, the wireless interface information may further include information peculiar to the LBE, such as a priority class specified in EN 301 598 of ETSI.

Furthermore, the wireless interface information may also include information related to a duplex mode supported by the communication device 110. As a representative example, for example, information regarding a scheme, such as frequency division duplex (FDD), time division duplex (TDD), or full duplex (FD), may be included.

In a case where TDD is included as the wireless interface information, TDD frame structure information used or supported by the communication device 110 may be given. Furthermore, information related to a duplex mode may be included for every frequency band indicated by the frequency band information.

In a case where FD is included as the wireless interface information, information regarding an interference power sensing level may be included.

Furthermore, the wireless interface information may also include information regarding a transmission diversity technique supported by the communication device 110. For example, space time coding (STC) or the like may be included.

Furthermore, the wireless interface information may also include guard band information. For example, information regarding a guard band size preliminarily defined for the wireless interface may be included. Alternatively, for example, information regarding a guard band size desired by the communication device 110 may be included.

Regardless of the aspects described above, the wireless interface information may be provided for every frequency band.

The legal information is typically information regarding regulations that the communication device 110 must comply with, defined by a radio wave administrative agency or an agency similar to the radio wave administrative agency in each country or region, approval information acquired by the communication device 110, and the like. Typically, the information regarding regulations may include, for example, upper limit value information about out-of-band emission, information regarding blocking characteristics of the receiver, and the like. Typically, the approval information may include, for example, type approval information, law and regulation information serving as the standard of the approval acquisition, and the like. The type approval information corresponds to, for example, an FCC ID of the United States, a Technical Registrations Conformity Certificate of Japan, or the like. The law and regulation information corresponds to, for example, an FCC regulation number of the United States, an ETSI Harmonized Standard number of Europe, or the like.

For the legal information regarding numerical values, numerical values defined in the standards of the wireless interface technology may be substituted. The standards of the wireless interface technology correspond to, for example, 3GPP TS 36.104, TS 38.104, or the like. In 3GPP TS 36.104, TS 38.104, or the like, an Adjacent Channel Leakage Ratio (ACLR) is specified. Instead of the upper limit value information about out-of-band emission, an upper limit value of out-of-band emission may be derived and utilized using an ACLR specified in the standards. Furthermore, the ACLR itself may be used as necessary. Furthermore, an adjacent channel selectivity (ACS) may be used instead of the blocking characteristics. Furthermore, these may be used together, or an adjacent channel interference ratio (ACIR) may be used. Note that in general, an ACIR has the following relationship with an ACLR and an ACS.

[Mathematical Formula 1]

$$ACIR = \left( \frac{1}{ACS} + \frac{1}{ACLR} \right)^{-1} \tag{1}$$

Note that although Expression (1) uses true value expression, Expression (1) may be expressed by logarithmic expression.

The installer information may include information that can specify a person (installer) who has installed the communication device 110, unique information associated with the installer, and the like. Representatively, the installer information may include information regarding a person who is responsible for the position information about the communication device 110, referred to as a Certified Professional Installer (CPI) defined in Non-Patent Document 3. In the CPI, a Certified Professional Installer Registration ID (CPIR-ID) and a CPI name are disclosed. Furthermore, as unique information associated with the CPI, for example, an address for contact (mailing address or contact address), an e-mail address, a telephone number, a public key identifier (PKI), and the like are disclosed. The installer information is not limited to the examples, and other information regarding the installer may be included in the installer information as necessary.

The group information may include information regarding a communication device group to which the communication device 110 belongs. Specifically, for example, information related to a type of group that is the same as or equivalent to a type of group as disclosed in WINNF-SSC-0010 may be included. Furthermore, for example, in a case where a network operator manages communication devices 110 on a group-by-group basis according to an operation policy of the network operator, information regarding the group may be included in the group information.

The information listed so far may be inferred by the communication control device 130 from other information provided from the communication device 110 without the communication device 110 providing the information listed so far to the communication control device 130. Specifically, for example, the guard band information can be inferred from the wireless interface information. In a case where the wireless interface used by the communication device 110 is E-UTRA or 5G NR, the guard band information can be inferred on the basis of the E-UTRA transmission bandwidth specification described in TS36.104 of the 3GPP, the 5G NR transmission bandwidth specification described in TS38.104 of the 3GPP, and tables described in TS38.104 and shown below.

TABLE 1

Table 5.6-1 Transmission bandwidth configuration NRB in
E-UTRA channel bandwidths (quotation from Table 5.6-1 of
TS36.104 of the 3GPP)

| Channel bandwidth BWchannel [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

TABLE 2

Table 5.3.3-1: Minimum guardband (kHz) (FR1) (quotation
from Table 5.3.3-1 of TS38.104 of the 3GPP)

| SCS (kHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 242.5 | 312.5 | 382.5 | 452.5 | 522.5 | 592.5 | 552.5 | 692.5 | N. A | N. A | N. A | N. A | N. A |
| 30 | 505 | 665 | 645 | 805 | 785 | 1945 | 905 | 1045 | 825 | 965 | 925 | 885 | 845 |
| 60 | N. A | 1010 | 990 | 1330 | 1310 | 1290 | 1610 | 1570 | 1530 | 1490 | 1450 | 1410 | 1370 |

TABLE 3

Table: 5.3.3-2: Minimum guardband (kHz) (FR2)
(quotation from Table: 5.3.3-2 of TS38.104 of the 3GPP)

| SCS (KHz) | 50 MHz | 100 MHz | 200 MHz | 400 MHz |
|---|---|---|---|---|
| 60 | 1210 | 2450 | 4930 | N. A |
| 120 | 1900 | 2420 | 4900 | 9860 |

TABLE 4

Table: 5.3.3-3: Minimum guardband (kHz) of SCS 240 kHz
SS/PBCH block (FR2) (quotation from TS38.104 Table:
5.3.3-3 of the 3GPP)

| SCS (kHz) | 100 MHz | 200 MHz | 400 MHz |
|---|---|---|---|
| 240 | 3800 | 7720 | 15560 |

In other words, it is sufficient if the communication control device 130 can acquire the information listed so far, and the communication device 110 does not necessarily need to provide the information in question for the communication control device 130. Furthermore, the intermediate device 130B (for example, a network manager) that puts a plurality of communication devices 110 together does not need to provide the information in question for the communication control device 130A. The communication device 110 or the intermediate device 130B providing information to the communication control device 130 or 130A is merely one means of information provision in the present exemplary embodiment. The information listed so far means that the information listed so far is information that may be necessary for the communication control device 130 to normally complete the present procedures, and means for providing the information do not matter.

<2.1.1.1 Supplement to Required Parameters>

In the registration procedure, in some cases, it is assumed that not only device parameters regarding the communication device 110 but also device parameters regarding the terminal 120 are requested to be registered in the communication control device 130. In such a case, the term "communication device" in the description given in <2.1.1> may be replaced with a term "terminal" or a term similar to the term "terminal", and the term "terminal" or the similar term may be applied. Furthermore, parameters peculiar to a "terminal" not described in <2.1.1> may also be treated as required parameters in the registration procedure. For example, a user equipment (UE) category specified by the 3GPP can be cited. <2.1.2 Details of Registration Processing>

As described above, the communication device 110) representing the wireless system that intends to utilize the shared frequency band generates a registration request including device parameters and notifies the communication control device 130 of the registration request.

Here, in a case where installer information is included in the device parameters, the communication device 110 may give tamper-proof processing or the like to the registration request by using the installer information. Furthermore, part or all of information included in the registration request may be given encryption processing. Specifically, for example, a peculiar public key may be shared in advance between the communication device 110 and the communication control device 130, and the communication device 110 may encrypt information using a secret key corresponding to the public key. Examples of the encryption target include sensitive security information, such as the position information.

Note that the ID and position information of the communication device 110 may be disclosed, and the communication control device 130 may preliminarily hold IDs and position information of main communication devices 110 existing in the coverage of the communication control device 130. In such a case, since the communication control device 130 can acquire position information from the ID of the communication device 110 that has transmitted a registration request, the position information does not need to be included in the registration request. Furthermore, it is also conceivable that the communication control device 130 returns necessary device parameters to the communication device 110 that has transmitted the registration request, and in response to the necessary device parameters, the communication device 110 transmits a registration request including the device parameters necessary for the registration. In this manner, the information included in the registration request may be different depending on the case.

After receiving the registration request, the communication control device 130 performs registration processing for the communication device 110, and returns a registration response according to a processing result. If there is no shortage or unusualness of information necessary for the registration, the communication control device 130 records the information in an internal or external storage device and provides notification of normal completion. Otherwise, notification of a registration failure is provided. In a case where the registration is normally completed, the communication control device 130 may allocate an ID to each of communication devices 110 and provide notification of the ID information at the time of response. In a case where the registration fails, the communication device 110 may provide notification of a corrected registration request again. Furthermore, the communication device 110 may change the registration request and try the registration procedure until the normal completion of.

Note that the registration procedure may be executed even after the registration is normally completed. Specifically, for example, the registration procedure may be executed again in a case where the position information is changed beyond a predefined standard due to movement, precision improvement, or the like. The predefined standard is typically defined by the legal system in each country or region. For example, in 47 C.F.R. Part 15 of the United States, a Mode II personal/portable white space device, that is, an apparatus utilizing an unused frequency, is obliged to perform a registration again in a case where the position of the device varies by 100 meters or longer.

<2.2 Available Frequency Information Query Procedure (Available Spectrum Query Procedure)>

An available frequency information query procedure is a procedure in which a wireless system that intends to utilize a shared frequency band queries the communication control device 130 about information regarding an available frequency. Note that the available frequency information query procedure does not necessarily need to be performed. Furthermore, a communication device 110 that makes a query as a representative of the wireless system that intends to utilize the shared frequency band may be the same as or different from the communication device 110 that has generated a registration request. Typically, a communication device 110 that makes a query notifies the communication control device 130 of a query request including information that can specify the communication device 110 in question, so that the procedure is started.

Here, typically, the available frequency information is information indicating a frequency at which the communication device 110 in question does not give fatal interference to a primary system, and secondary utilization is safely possible.

The available frequency information is determined, for example, on the basis of a secondary utilization prohibition area referred to as an exclusion zone. Specifically, for example, in a case where the communication device 110 is installed in a secondary utilization prohibition area provided for the purpose of protecting a primary system utilizing a frequency channel F1, the communication device 110 is not notified of the frequency channel referred to as F1 as an available channel.

The available frequency information may also be determined by, for example, the degree of interference given to the primary system. Specifically, for example, in a case where even outside the secondary utilization prohibition area, it is determined that critical interference is given to the primary system, the frequency channel in question may not be provided in notification as an available channel. An example of a specific calculation method is described in <2.2.2> described later.

Furthermore, as described above, a frequency channel that is not provided in notification as available may exist depending on other conditions than the primary system protection requirements. Specifically, for example, in order to avoid interference that may occur between communication devices 110 in advance, a frequency channel being utilized by another communication device 110 existing in the vicinity of the communication device 110 in question may not be provided in notification as an available channel. In this manner, the available frequency information set considering interference with another communication device 110 may be set as, for example, "recommended utilization frequency information", and provided together with the available frequency information. That is, the "recommended utilization frequency information" is desirably a subset of the available frequency information.

Even in a case of having an influence on a primary system, if the influence can be avoided by reducing transmission power, a frequency same as the frequency of the primary system or a neighboring communication device 110 may be provided in notification as an available channel. In such a case, typically, maximum allowable transmission power information is included in the available frequency information. The maximum allowable transmission power is typically expressed by equivalent isotropic radiated power (EIRP). The maximum allowable transmission power does not necessarily need to be limited to the EIRP, and may be provided by, for example, a combination of a transmitter power output (conducted power) and an antenna gain. Moreover, for the antenna gain, an allowable peak gain may be set for every spatial direction.

<2.2.1 Details of Required Parameters>

As information that can specify a wireless system that intends to utilize a shared frequency band, for example, unique information registered at the time of the registration procedure, the above-described ID information, and the like may be assumed.

Furthermore, the query request may also include query requirement information. The query requirement information may include, for example, information indicating a frequency band for which it is desired to know whether or not the frequency band is available. Furthermore, for example, transmission power information may also be included. The communication device 110 that makes a query may include the transmission power information in, for example, a case where it is desired to know only frequency information in which desired transmission power can be used. The query requirement information does not necessarily need to be included in the query request.

Furthermore, the query request may also include a measurement report. The measurement report includes a result of measurement performed by the communication device 110 and/or the terminal 120. Part or all of the measurement results may be represented by raw data or may be represented by processed data. For example, standardized metrics represented by reference signal received power (RSRP), reference signal strength indicator (RSSI), and reference signal received quality (RSRQ) may be used for the measurement.

<2.2.2 Details of Available Frequency Evaluation Processing>

After receiving the query request, available frequency is evaluated on the basis of the query requirement information. For example, as described above, available frequency can be evaluated considering the existence of a primary system, a secondary utilization prohibition area of the primary system, and a neighboring communication device 110.

The maximum allowable transmission power information may be derived. Typically, the maximum allowable transmission power information is reckoned by using allowable interference power information in a primary system or a protection zone of the primary system, position information about a reference point for computing an interference power level suffered by the primary system, registration information about the communication device 110, and a propagation loss estimation model. Specifically, as an example, the maximum allowable transmission power information is reckoned by the following mathematical expression.

[Mathematical Formula 2]

$$P_{MaxTx(dBm)}=I_{Th(dBm)}+PL(d)(\text{dB}) \qquad (2)$$

where $P_{MaxTx(dBm)}$ is maximum allowable transmission power, $I_{Th(dBm)}$ is allowable interference power (a limit value of allowable interference power), d is a distance between a predefined reference point and the communication device 110, and $PL(d)_{(dB)}$ is a propagation loss at the distance d. In Expression (2), the antenna gain in the transceiver is not included, but the antenna gain in the transceiver may be included according to an expression method of the maximum allowable transmission power (EIRP, conducted power, or the like) or a referred point of received power (antenna input point, antenna output point, or the like). Furthermore, feeder loss may be considered as necessary. The present exemplary embodiment is applied, for example, when the maximum allowable transmission power information is derived. The details will be described later.

Furthermore, Expression (2) is described on the basis of the supposition that a single communication device 110 is an interference source (single station interference). For example, in a case where it is necessary to consider cumulative interference (aggregated interference) from a plurality of communication devices 110 at the same time, a correction value may be added. Specifically, for example, the correction value may be determined on the basis of three types (fixed/predetermined, flexible, and flexible minimized) of interference margin schemes disclosed in Non-Patent Document 4 (ECC Report 186).

Note that the allowable interference power information itself is not necessarily directly available unlike Expression (2). For example, in a case where a signal power-to-interference power ratio (SIR), a signal to interference plus noise ratio (SINR), an interference-to-noise ratio (INR), and the like required for a primary system are available, the signal power-to-interference power ratio (SIR), the signal to interference plus noise ratio (SINR), the interference-to-noise ratio (INR), and the like may be converted into allowable interference power and used. Note that such conversion processing is not limited to this processing, and may be applied to processing of other procedures.

Note that although Expression (2) is expressed using logarithms, it is a matter of course that Expression (2) may be converted into antilogarithms and used at the time of implementation. Furthermore, all parameters in logarithmic notation described in the present disclosure may be appropriately converted into antilogarithms and used.

Furthermore, in a case where the foregoing transmission power information is included in the query requirement information, the available frequency can be evaluated by a method different from the foregoing method. Specifically, for example, in a case where it is supposed that desired transmission power indicated by the transmission power information is used, when an estimated amount of given interference is less than allowable interference power in a primary system or a protection zone of the primary system, it is determined that a frequency channel in question is available, and the communication device 110 is notified of the frequency channel.

Furthermore, for example, in a case where an area or a space in which the communication device 110 can use a shared frequency band is preliminarily defined, similarly to an area of a radio environment map (REM), the available frequency information may be derived simply on the basis of only coordinates (coordinates of an X axis, a Y axis, and a Z axis of the communication device 110, or a latitude, a longitude, and a height above ground level) included in the position information about the communication device 110. Furthermore, for example, even in a case where a lookup table that associates coordinates of the position of the communication device 110 with available frequency information is prepared, the above-described available frequency information may be derived on the basis of only the position information about the communication device 110. As described above, there are various methods for determining the available frequency, and the methods are not limited to the example of the present disclosure.

Furthermore, in a case where the communication control device 130 acquires information about a capability of a band extension technology, such as carrier aggregation (CA) or channel bonding, as the frequency band information supported by the communication device 110, the communication control device 130 may include an available combination, a recommended combination, or the like thereof in the available frequency information.

Furthermore, in a case where the communication control device 130 acquires information about a combination of frequency bands supported by dual connectivity and multi connectivity, as the frequency band information supported by the communication device 110, the communication control device 130 may include information, such as an available frequency and a recommended frequency, in the available frequency information, for dual connectivity and multi connectivity.

Furthermore, in a case where the available frequency information is provided for the band extension technology as described above, when the imbalance of the maximum allowable transmission power occurs between a plurality of frequency channels, the available frequency information may be provided after the maximum allowable transmission power of each of the frequency channels is adjusted. For example, from a perspective of primary system protection, the maximum allowable transmission power of each frequency channel may be aligned with the maximum allowable transmission power of a frequency channel having a low maximum allowable power flux density (power spectral density (PSD)).

The evaluation of the available frequency does not necessarily need to be performed after the query request is received. For example, after the normal completion of the above-described registration procedure, the communication control device 130 may independently perform the evaluation of the available frequency without a query request. In such a case, an REM or a lookup table shown above as an example, or an information table similar to the REM or the lookup table may be created.

Furthermore, a radio wave utilization priority, such as a PAL or a GAA, may also be evaluated. For example, in a case where registered device parameters or query requirements include information regarding a radio wave utilization priority, it may be determined whether frequency utilization is possible on the basis of the priority, and the notification may be made. Furthermore, for example, as disclosed in Non-Patent Document 3, in a case where information regarding a communication device 110 that performs high priority utilization (for example, a PAL) (referred to as a Cluster List in Non-Patent Document 3) is registered in the communication control device 130 from the user in advance, the evaluation may be performed on the basis of the information.

After the evaluation of the available frequency is completed, the communication control device 130 notifies the communication device 110 of the evaluation result.

The communication device 110 may select desired communication parameters by using the evaluation result received from the communication control device 130.

<2.3 Frequency Utilization Permission Procedure (Spectrum Grant Procedure)>

A frequency utilization permission procedure is a procedure for a wireless system that intends to utilize a shared frequency band to receive a secondary-utilization permission of the frequency from the communication control device 130. A communication device 110 that performs the frequency utilization permission procedure as a representative of the wireless system may be the same as or different from the communication device(s) 110 that has/have performed the procedures so far. Typically, a communication device 110 notifies the communication control device 130 of a frequency utilization permission request including information that can specify the communication device 110 in question, so that the procedure is started. Note that as described above, the available frequency information query procedure is not essential. Therefore, the frequency utilization permission procedure may be performed next to the available frequency information query procedure, or may be performed next to the registration procedure.

In the present exemplary embodiment, it is assumed that at least the following two types of frequency utilization permission request schemes may be used.

Designation scheme

Flexible scheme

The designation scheme is a request scheme in which the communication device 110 designates desired communication parameters and requests the communication control device 130 to permit operation based on the desired communication parameters. The desired communication parameters include, but are not particularly limited to, a frequency channel to be utilized, maximum transmission power, and the like. For example, a parameter peculiar to a wireless interface technology (such as a modulation scheme or a duplex mode) may be designated. Furthermore, information indicating a radio wave utilization priority, such as a PAL or a GAA, may be included.

The flexible scheme is a request scheme in which the communication device 110 designates only requirements regarding communication parameters, and requests the communication control device 130 to designate communication parameters that can permit secondary utilization while satisfying the requirements. Examples of the requirements regarding the communication parameters include, but are not particularly limited to, a bandwidth, desired maximum transmission power, desired minimum transmission power, and the like. For example, a parameter peculiar to a wireless interface technology (such as a modulation scheme or a duplex mode) may be designated. Specifically, for example, one or more of TDD frame structures may be selected in advance and provided in notification.

Similarly to the query request, the frequency utilization permission request may also include a measurement report in either the designation scheme or the flexible scheme. The measurement report includes a result of measurement performed by the communication device 110 and/or the terminal 120. The measurement may be represented by raw data or processed data. For example, standardized metrics represented by reference signal received power (RSRP), reference signal strength indicator (RSSI), and reference signal received quality (RSRQ) may be used for the measurement.

Note that the scheme information used by the communication device 110 may be registered in the communication control device 130 at the time of the registration procedure described in <2.1>.

<2.3.1 Details of Frequency Utilization Permission Processing>

After receiving the frequency utilization permission request, the communication control device 130 performs frequency utilization permission processing on the basis of the frequency utilization permission request scheme. For example, it is possible to utilize the technique described in <2.2> to perform the frequency utilization permission processing considering the existence of a primary system, a secondary utilization prohibition area, and a neighboring communication device 110, and the like. The present exemplary embodiment is applied to, for example, frequency utilization permission processing. The details will be described later.

In a case where the flexible scheme is used, the maximum allowable transmission power information may be derived by utilizing the technique described in <2.2.2>. Typically, the maximum allowable transmission power information is reckoned by using allowable interference power information in a primary system or a protection zone of the primary system, position information about a reference point for computing an interference power level suffered by the primary system, registration information about the communication device 110, and a propagation loss estimation model. Specifically, as an example, the maximum allowable transmission power information is reckoned by the above-described Expression (2).

Furthermore, as described above, Expression (2) is described on the basis of the supposition that a single communication device 110 is an interference source. For example, in a case where it is necessary to consider cumulative interference (aggregated interference) from a plurality of communication devices 110 at the same time, a correction value may be added. Specifically, for example, the correction value may be determined on the basis of three types (fixed/predetermined, flexible, and flexible minimized) of schemes disclosed in Non-Patent Document 4 (ECC Report 186).

The communication control device 130 may use various propagation loss estimation models in the frequency utilization permission procedure, the available frequency evaluation processing for an available frequency information query request, and the like. In a case where a model is designated for every application, it is desirable to use the designated model. For example, in Non-Patent Document 3 (WINNF-TS-0112), a propagation loss model, such as extended Hata (eHATA) or an Irregular Terrain Model (ITM), is adopted for every application. Of course, the propagation loss model is not limited to the examples.

Propagation loss estimation models that need information regarding radio wave propagation paths also exist. The information regarding a radio wave propagation path may include, for example, information indicating the inside and outside of a line of sight (line of sight (LOS) and/or non line of sight (NLOS), topographical information (undulations, sea levels, and the like), environmental information (urban, suburban, rural, open sky, etc.), and the like. When utilizing the propagation loss estimation model, the communication control device 130 may infer these pieces of information from the already acquired registration information about the communication device 110 or information about a primary system. Alternatively, in a case where there are parameters designated in advance, it is desirable to use the parameters.

In a case where propagation loss estimation models are not designated in predefined applications, propagation loss estimation models may be selectively used as necessary. For example, when interference power given to other communication devices 110 is estimated, a model a loss calculated with which is smaller, such as a free space loss model, can be selectively used, but when the coverage of a communication device 110 is estimated, a model a loss calculated with which is larger can be selectively used.

Furthermore, in a case where a designated propagation loss estimation model is used, the frequency utilization permission processing can be performed by evaluating a given interference risk, as an example. Specifically, for example, in a case where it is supposed that desired transmission power indicated by transmission power information is used, when an estimated amount of given interference is less than allowable interference power in a primary system or a protection zone of the primary system, it is determined that utilization of a frequency channel in question can be permitted, and the communication device 110 is notified of the frequency channel.

In the technique of either the designation scheme or the flexible scheme, a radio wave utilization priority, such as a PAL or a GAA, may also be evaluated similarly to the query request. For example, in a case where registered device parameters or query requirements include information regarding a radio wave utilization priority, it may be determined whether frequency utilization is possible on the basis of the priority, and the notification may be made. Furthermore, for example, in a case where information regarding a communication device 110 that performs high priority utilization (for example, a PAL) is registered in the communication control device 130 from the user in advance, the evaluation may be performed on the basis of the information. For example, in Non-Patent Document 3 (WINNF-TS-0112), information regarding the communication device 110 is referred to as a Cluster List.

The frequency utilization permission processing does not necessarily need to be performed due to the reception of the frequency utilization permission request. For example, after the normal completion of the above-described registration procedure, the communication control device 130 may independently perform the frequency utilization permission processing without the frequency utilization permission request. Furthermore, for example, the frequency utilization permission processing may be performed at regular intervals. In such a case, the foregoing REM or lookup table, or an information table similar to the REM or lookup table may be created. Therefore, since a frequency that can be permitted is determined only by the position information, the communication control device 130 can quickly return a response after receiving the frequency utilization permission request.

<2.4 Frequency Utilization Notification (Spectrum Use Notification/Heartbeat)>

A frequency utilization notification is a procedure in which a wireless system utilizing a shared frequency band notifies the communication control device 130 of utilization of a frequency based on communication parameters allowed to be utilized in the frequency utilization permission procedure. A communication device 110 that performs the frequency utilization notification as a representative of the wireless system may be the same as or different from the communication device(s) 110 that has/have performed the procedures so far. Typically, the communication device 110 notifies the communication control device 130 of a notification message including information that can specify the communication device 110 in question.

The frequency utilization notification is desirably performed periodically until the utilization of the frequency is rejected from the communication control device 130. In that case, the frequency utilization notification is also referred to as a heartbeat.

After receiving the frequency utilization notification, the communication control device 130 may determine whether or not to start or continue the frequency utilization (in other words, radio wave transmission at the permitted frequency). Examples of the determination method include confirmation of the frequency utilization information about a primary system. Specifically, it is possible to determine permission or denial of the start or continuation of the frequency utilization (radio wave transmission at the permitted frequency) on the basis of a change in the utilization frequency of the primary system, a change in the frequency utilization status of the primary system whose radio wave utilization is not steady (for example, a marine radar of the CBRS of the United States), and the like. If the start or continuation is permitted, the communication device 110 may start or continue frequency utilization (radio wave transmission at the permitted frequency).

After receiving the frequency utilization notification, the communication control device 130 may order the communication device 110 to reconfigure the communication parameters (reconfiguration). Typically, in the response of the communication control device 130 to the frequency utilization notification, the reconfiguration of the communication parameters may be ordered. For example, information regarding recommended communication parameters (hereinafter, recommended communication parameter information) may be provided. The communication device 110 for which the recommended communication parameter information has been provided desirably performs the frequency utilization permission procedure described in <2.4> again using the recommended communication parameter information.

<2.5 Supplement to Various Procedures>

The above-described procedures do not necessarily need to be implemented individually, as described below. For example, two different procedures may be implemented by substituting a third procedure with roles of the two different procedures. Specifically, for example, the registration request and the available frequency information query request may be integrally provided in notification. Furthermore, for example, the frequency utilization permission procedure and the frequency utilization notification may be integrally performed. As a matter of course, these combinations are not limiting, and three or more procedures may be performed integrally. Furthermore, as described above, a plurality portions of one procedure may be separately performed.

Furthermore, the expression "to acquire" or an expression similar to the expression in the present disclosure does not necessarily mean to acquire according to the procedure described in the present disclosure. For example, although in the available frequency evaluation processing, it is described that the position information about the communication device 110 is used, it means that the information acquired in the registration procedure does not necessarily need to be used, and in a case where the position information is included in the available frequency query procedure request, the position information may be used. In other words, the procedure for acquisition described in the present disclosure is an example, and acquisition by another procedure is also allowed within the scope of the present disclosure and within the scope of technical feasibility.

Furthermore, the information described being possible to be included in a response from the communication control device 130 to the communication device 110 may be actively provided in notification from the communication control device 130 in a push scheme if possible. As a specific example, the available frequency information, the recommended communication parameter information, the radio wave transmission continuation denial notification, and the like may be provided in notification in a push scheme.

<2.6 Various Procedures regarding Terminal>

The description has been made mainly on the assumption of the processing in the communication device 110A. However, in some exemplary embodiments, not only the communication device 110A but also the terminal 120 and the communication device 110B may operate under the management of the communication control device 130. That is, a scenario in which the communication parameters are determined by the communication control device 130 is assumed. Even in such a case, basically, each procedure described from <2.1> to <2.4> can be used. However, unlike the communication device 110A, the terminal 120 and the communication device 110B need to use a frequency managed by the communication control device 130 for the backhaul link, and cannot perform radio wave transmission without the permission. Therefore, it is desirable to start backhaul communication for the purpose of accessing the communication control device 130 only after a radio wave or an authorization signal transmitted by the communication device 110A (communication device 110 capable of providing wireless communication service or master communication device 110 of a master/slave type) is sensed.

On the other hand, under the management of the communication control device 130, allowable communication parameters may also be set for the terminal or the communication device 110B for the purpose of primary system protection. However, the communication control device 130 cannot know the position information and the like of these devices in advance. Furthermore, there is a high possibility that these devices have mobility. That is, the position information is dynamically updated. Depending on the legal system, in a case where the position information varies by a fixed amount or more, re-registration in the communication control device 130 may be obligated.

Such various utilization forms, operation forms, and the like of the terminal 120 and the communication device 110 are added to specify the following two types of communication parameters in the operation forms of TVWSs defined by the Office of Communication (Ofcom) in the United Kingdom (Non-Patent Document 5).

Generic operational parameters

Specific operational parameters

The generic operational parameters are communication parameters defined as "parameters that can be used by any slave white space device (WSD) located within the coverage area of a predefined master WSD (corresponding to the communication device 110)" in Non-Patent Document 5. As a feature, the generic operational parameters are calculated by a white space database (WSDB) without using the position information about a slave WSD.

The generic operational parameters may be provided by unicast or broadcast from the communication device 110 already permitted by the communication control device 130 to transmit radio waves. For example, a broadcast signal represented by a contact verification signal (CVS) specified in Part 15 Subpart H of the FCC rule of the United States may be used. Alternatively, the generic operational parameters may be provided by a broadcast signal peculiar to a wireless interface. Therefore, the terminal 120 and the communication device 110B can be treated as communication parameters used for radio wave transmission for the purpose of accessing the communication control device 130.

The specific operational parameters are communication parameters defined as "parameters usable by specific slave white space devices (WSDs)" in Non-Patent Document 5. In other words, the specific operational parameters are communication parameters calculated using device parameters of a slave WSD corresponding to the terminal 120. As a feature, the specific operational parameters are calculated by a WSDB using the position information about a slave WSD.

<2.7 Procedure Occurring between Communication Control Devices>

<2.7.1 Information Exchange>

The communication control device 130 can exchange management information with another communication control device 130. At least the following information is desirably exchanged.

Information related to communication device 110

Protection target system information

The information related to the communication device 110 includes at least registration information and communication parameter information about the communication device 110 operating under permission of the communication control device 130. Registration information about the communication device 110 having no permitted communication parameters may be included.

The registration information about the communication device 110 is typically device parameters of the communication device 110 registered in the communication control device 130 in the above-described registration procedure. Not all the registered information necessarily needs to be exchanged. For example, information that may correspond to personal information does not need to be exchanged. Furthermore, when the registration information about the communication device 110 is exchanged, the registration information may be encrypted and exchanged, or the information may be exchanged after the content of the registration information is made ambiguous. For example, information converted into a binary value or information signed using an electronic signature mechanism may be exchanged.

The communication parameter information about the communication device 110 is typically information related to communication parameters currently used by the communication device 110. At least information indicating the utilized frequency and the transmission power is desirably included. Other communication parameters may be included.

Area information is typically information indicating a predefined geographical zone. The information may include zone information about various attributes in various aspects.

For example, as in a PAL Protection Area (PPA) disclosed in Non-Patent Document 3 (WINNF-TS-0112), protection zone information about the communication device 110 serving as a high priority secondary system may be included in the area information. The area information in this case may be expressed by, for example, a set of three or more coordinates indicating a geographical position. Furthermore, for example, in a case where a plurality of communication control devices 130 can refer to a common external database, the area information may be expressed by a unique ID, and an actual geographical zone may be referred to from the external database using the ID.

Furthermore, for example, information indicating the coverage of the communication device 110 may be included. The area information in this case may also be expressed by, for example, a set of three or more coordinates indicating a geographical position. Furthermore, for example, assuming that the coverage is a circle centered on the geographical position of the communication device 110, the area information may also be expressed by information indicating the size of the radius. Furthermore, for example, in a case where a plurality of communication control devices 130 can refer to a common external database that records area information, the information indicating the coverage may be expressed by a unique ID, and the actual coverage may be referred to from the external database using the ID.

Furthermore, as another aspect, information related to an area section preliminarily defined by an administration or the like may also be included. Specifically, for example, it is possible to indicate a fixed zone by indicating an address. Furthermore, for example, a license area or the like may be similarly expressed.

Furthermore, as still another aspect, the area information does not necessarily need to express a planar area, and may express a three-dimensional space. For example, the area information may be expressed using a spatial coordinate system. Furthermore, for example, information indicating a predefined closed space, such as a floor number, a floor, and a room number of a building, may be used.

The protection target system information is, for example, information about a wireless system treated as a protection target, such as the aforementioned Incumbent Tier. Examples of status in which this information needs to be exchanged include the state in which cross-border coordination is necessary. It is well conceivable that between neighboring countries or regions, different protection targets exist in the same band. In such a case, the protection target system information may be exchanged as necessary between different communication control devices 130 in different countries or regions to which the communication control devices 130 belong.

As another aspect, the protection target system information may include information about a secondary licensee, and information about a wireless system operated by the secondary licensee. The secondary licensee is specifically the lessee of the license, and, for example, it is assumed that the secondary licensee borrows a PAL from the holder and operates the wireless system owned by the secondary licensee. In a case where the communication control device 130 independently performs the lease management, information about the secondary licensee and information about the wireless system operated by the secondary licensee may be exchanged with another communication control device for the purpose of protection.

These pieces of information may be exchanged between the communication control devices 130 regardless of decision-making topologies applied to the communication control devices 130.

Furthermore, these pieces of information may be exchanged in various schemes. Examples of the schemes will be described below.

ID designation scheme

Period designation scheme

Zone designation scheme

Dump scheme

The ID designation scheme is a scheme in which an ID preliminarily given to specify information managed by the communication control device 130 is used to acquire information corresponding to the ID. For example, it is supposed that a first communication control device 130 manages a communication device 110 with an ID of AAA. At this time, a second communication control device 130 designates the ID of AAA and makes an information acquisition request to the first communication control device 130. After receiving the request, the first communication control device 130 searches for information about the ID of AAA, and provides notification, by a response, of information regarding the communication device 110 of the ID of AAA, for example, the registration information, the communication parameter information, and the like.

The period designation scheme is a scheme in which information satisfying a predefined condition in a designated specific period may be exchanged.

Examples of the predefined condition include the presence or absence of information update. For example, in a case where acquisition of information regarding communication devices 110 in a specific period is designated with a request, notification of registration information about communication devices 110 newly registered within the specific period may be provided with a response. Furthermore, notification of registration information or communication parameter information about communication devices 110 whose communication parameters have been changed within the specific period may also be provided with a response.

Examples of the predefined condition include whether recording has been performed by the communication control device 130. For example, in a case where acquisition of information regarding communication devices 110 in a specific period is designated with a request, notification of registration information or communication parameter information recorded by the communication control device 130 in the period may be provided with a response. In a case where information is updated in the period, notification of the latest information in the period may be provided. Alternatively, notification of an update history may be provided for every piece of information.

In the zone designation scheme, a specific zone is designated, and information about communication devices 110 belonging to the zone is exchanged. For example, in a case where acquisition of information regarding communication devices 110 in a specific zone is designated with a request, notification of registration information or communication parameter information about communication devices 110 installed in the zone may be provided with a response.

The dump scheme is a scheme in which all information recorded by the communication control device 130 is provided. At least information related to communication devices 110 and area information are desirably provided by the dump scheme.

All of the above description of the information exchange between the communication control devices 130 is based on a pull scheme. That is, the information exchange is a form in which information corresponding to a parameter designated with a request is responded, and may be implemented by Hyper Text Transfer Protocol (HTTP) GET method as an example. However, the communication exchange does not need to be limited to the pull scheme, and information may be actively provided for another communication control device 130 by a push scheme. The push scheme may be implemented by HTTP POST method as an example.

<2.7.2 Ordering/Asking Procedure>

The communication control devices 130 may order or ask each other. Specifically, as an example, reconfiguration of communication parameters of the communication device 110 is exemplified. For example, in a case where it is determined that a first communication device 110 managed by a first communication control device 130 is greatly interfered with by a second communication device 110 managed by a second communication control device 130, the first communication control device 130 may ask the second communication control device 130 to change the communication parameters of the second communication device 110.

Another example is reconfiguration of area information. For example, in a case where calculation of coverage information or protection zone information regarding a second communication device 110 managed by a second communication control device 130 is incomplete, a first communication control device 130 may ask the second communication control device 130 to reconfigure area information in question. Besides these examples, area information reconfiguration may be asked for various reasons.

<2.8 Information Transmission Means>

Notification (signaling) between entities described so far may be implemented via various media. The description will be made with E-UTRA or 5G NR as an example. As a matter of course, the notification (signaling) is not limited to E-UTRA and 5G NR at a time of performing the notification (signaling).

<2.8.2 Signaling between Communication Control Device 130 and Communication Device 110>

A notification from the communication device 110 to the communication control device 130 may be performed in, for example, an application layer. For example, Hyper Text Transfer Protocol (HTTP) may be used for the performing. Signaling may be performed by describing required parameters in HTTP message body according to a predefined manner. Moreover, in a case where HTTP is used, a notification from the communication control device 130 to the communication device 110 is also performed according to a HTTP response mechanism.

<2.8.3 Signaling between Communication Device 110 and Terminal 120>

A notification from the communication device 110 to the terminal 120 may be performed using, for example, at least one of wireless resource control (radio resource control (RRC)) signaling, system information (SI), or downlink control information (DCI). Furthermore, as downlink physical channels, there are a physical downlink control channel (PDCCH), a physical downlink shared channel (PDSCH), a physical broadcast channel (PBCH), an NR-PDCCH, an NR-PDSCH, an NR-PBCH, and the like, but at least one of the PDCCH, the PDSCH, the PBCH, the NR-PDCCH, the NR-PDSCH, the NR-PBCH, or the like may be used to perform the notification.

A notification from the terminal 120 to the communication device 110 may be performed using, for example, radio resource control (RRC) signaling or uplink control information (UCI). Furthermore, an uplink physical channel (a physical uplink control channel (PUCCH), a physical uplink shared channel (PUSCH), or a physical random access channel (PRACH)) may be used for the performing.

The signaling is not limited to the physical layer signaling described above, and may be performed in a higher layer. For example, when the signaling is performed in an application layer, the signaling may be performed by describing required parameters in HTTP message body according to a predefined manner.

<2.8.4 Signaling between Terminals 120>

FIG. 6 illustrates an example of a flow of signaling in a case where device-to-device (D2D) or vehicle-to-everything (V2X), which is communication between the terminals 120, is assumed as communication of a secondary system. D2D or V2X, which is communication between the terminals 120, may be performed using a physical sidelink channel (a physical sidelink control channel (PSCCH), a physical sidelink shared channel (PSSCH), or a physical sidelink broadcast channel (PSBCH)). The communication control device 130 calculates communication parameters to be used by the secondary system (T101), and notifies the communication device 110 of the secondary system of the calculated communication parameters (T102). Values of the communication parameters may be determined and provided in notification, or conditions indicating ranges and the like of the communication parameters may be determined and provided in notification. The communication device 110 acquires the communication parameters to be used by the secondary system (T103), and sets communication parameters to be used by the communication device 110 itself (T104). Then, the terminals 120 under the control of the communication device 110 are notified of communication parameters to be used by the terminals 120 (T105). Each of the terminals 120 under the control of the communication device 110 acquires (T106) and sets (T107) the communication parameters to be used by the terminal 120. Then, communication with another terminal 120 of the secondary system is performed (T108).

Communication parameters in a case where a target frequency channel of frequency sharing is used for a sidelink (direct communication between the terminals 120) may be provided in notification, acquired, or set in a form in which the communication parameters are associated with a resource pool for the sidelink in the target frequency channel. The resource pool is a wireless resource for a sidelink set by a specific frequency resource or time resource. Examples of the frequency resource include a resource block, a component carrier, and the like. Examples of the time resource include a wireless frame (radio frame), a subframe, a slot, a mini-slot, and the like. In a case where a resource pool is set in a frequency channel that is a target of frequency sharing, the resource pool is set for the terminal 120 by the communication device 110 on the basis of at least one of RRC signaling, system information, or downlink control information. Then, communication parameters to be applied in the resource pool and the sidelink are also set for the terminal 120 by the communication device 110 on the basis of at least one of RRC signaling, system information, or downlink control information from the communication device 110 to the terminal 120. A notification of the setting of the resource pool and a notification of the communication parameters to be used in the sidelink may be performed simultaneously or individually.

3. PPA Leasing and PPA Partial Leasing

A service is conceivable in which an operator holding a priority access license (PAL), which is a right to priority utilization of radio waves in a certain area, integrally leases a frequency band and an infrastructure to another operator. The lease may be either charged or free. As the infrastructure to be leased, there is the communication device 110, such as a citizens broadband radio service device (CBSD), that is a base station (or proxy) operated by the operator holding the PAL. In the present exemplary embodiment, the communication device 110 (CBSD) is treated as the infrastructure to be leased. The network of the operator holding the PAL is protected from interference by a protection area referred to as a PAL protection area (PPA). In a case where a frequency band and the communication device 110 are integrally leased to another operator, it is desirable to provide, for the lessee operator, part or all of the PPA provided for the operator.

In the present exemplary embodiment, a mechanism is provided in which in a case where an operator leases the communication device 110 and a frequency band to another operator, the permission for priority utilization of the frequency band permitted to the communication device 110 is also handed over together. Specifically, a mechanism for leasing a permission (grant) for priority utilization of a frequency band together with leasing of the communication device 110 is provided.

The grant to be leased is a priority access license (PAL) grant given by the communication control device 130, such as a spectrum access system (SAS). In giving the grant, the communication control device 130 examines a set of the maximum allowable EIRP and the frequency channel (frequency band) requested from the communication device 110, on the basis of the PAL of the operator holding the communication device 110. Then, the requested maximum allowable EIRP and frequency channel are authenticated as the grant. When authenticating the grant, the communication control device 130 issues a permission identifier of the authenticated grant (grant ID), and notifies the communication device 110 of a permission for priority utilization (priority access (PA)) of the frequency band and the grant ID. The grant to be leased in the present exemplary embodiment is a PAL grant given to the communication device 110 by the communication control device 130 on the basis of the PAL of the operator as described above.

In the present exemplary embodiment, due to the provision of such a mechanism for leasing the communication device 110 and the grant, a lessee operator does not need to newly re-obtain a permission (grant) for a utilization priority of the frequency band for the communication device 110. Therefore, it is possible to quickly implement provision of part or all of the PPA provided for the lessor operator, for the lessee operator.

In the present exemplary embodiment, providing an entire PPA to a lessee operator is referred to as PPA transfer or PPA leasing. Providing part of a PPA to a lessee operator is referred to as PPA disaggregation or PPA partial leasing.

FIG. 7 illustrates a PPA #1 and a PPA #2 as two PPA examples. The PPA #1 includes, for example, eight communication devices 110 (CBSDs). The eight communication devices 110 have coverages based on a predefined transmission power value, and a combination of the coverages of the eight communication devices 110 corresponds to the PPA #1. The PPA #2 includes, for example, six communication devices 110. The six communication devices 110 have coverages based on a predefined transmission power value, and a combination of the coverages of the six communication devices 110 corresponds to the PPA #2. In the following description, the PPA #2 is used to describe the PPA leasing. The PPA #1 is used to describe the PPA partial leasing. In the PPA partial leasing, two communication devices 110 surrounded by a broken line among the communication devices 110 constituting the PPA #1 are leased.

[PPA Leasing]

The process of the PPA leasing is performed in the following procedure.

(A1) User Registration of Lessee Operator (CBSD User Registration)

(A2) Procedure for Leasing Communication Device 110 and Permission (Grant) for Priority Utilization of Frequency Band (A1) User Registration of Lessee Operator (CBSD User Registration)

A PPA lessee operator performs user registration in advance, and acquires a user account related to utilization of the communication control device 130. The communication control device 130 is a server that performs frequency management and control of the communication device 110, and will be described as a spectrum access system (SAS) in the present exemplary embodiment. The lessee operator acquires, as a user account, a user registration ID (UR-ID) that is an ID capable of identifying at least a user who is the operator. In acquiring the user account, it is desirable that at least the following information is provided for the communication control device 130.

The name of the operator

The administrative registration number (for example, the FCC registration number (FRN)) or the like A call sign (ID capable of identifying the communication device 110)

(A2) Procedure for Leasing Communication Device 110 and Permission (Grant) for Priority Utilization of Frequency Band It is assumed that in the procedure for leasing the communication device 110 and a permission (grant) for priority utilization of a frequency band, the communication control device 130 is furnished with a dedicated application programming interface (API). The dedicated API and behaviors of the communication control device 130 and the communication device 110 related to the dedicated API will be described later.

In the present exemplary embodiment, a registration state diagram obtained by adding an improvement to the registration state diagram defined in WINNF-TS-0016 is defined. The registration state diagram is a state transition diagram representing a transition of a registration state of a communication device (CBRS). The registration is the registration of device parameters of the communication device 110 described in <2.1 Registration Procedure>. In the present exemplary embodiment, the communication control device 130 and the communication device 110 perform operation based on the improved registration state diagram regarding control of the registration state of the communication device 110. Therefore, implemented is a mechanism for, even in a case where an operator who operates the communication device 110 changes, maintaining, under the control of the new operator, a grant held by the communication device 110 without discarding the grant.

Figure 8:
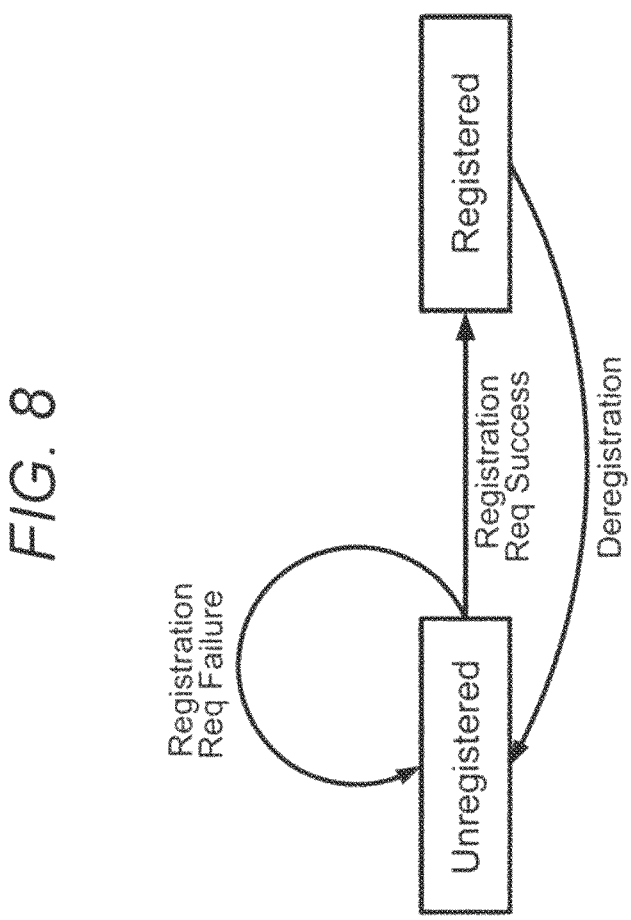
FIG. 8 is a registration state diagram defined in WINNF-TS-0016.

FIG. 8 illustrates the registration state diagram defined in WINNF-TS-0016. This registration state diagram is extracted from WINNF-TS-0016. Before the registration, the registration state of the communication device 110 is "Unregistered", and when the registration process is successful (Registration Req Success), the registration state of the communication device 110 transitions to "Registered". When the registration process fails (Registration Req Failure), the registration state of the communication device 110 remains "Unregistered". When the registration is canceled (Deregistration), the registration state of the communication device 110 returns to "Unregistered". At this time, the grant given to the registered communication device 110 is discarded.

Figure 9:
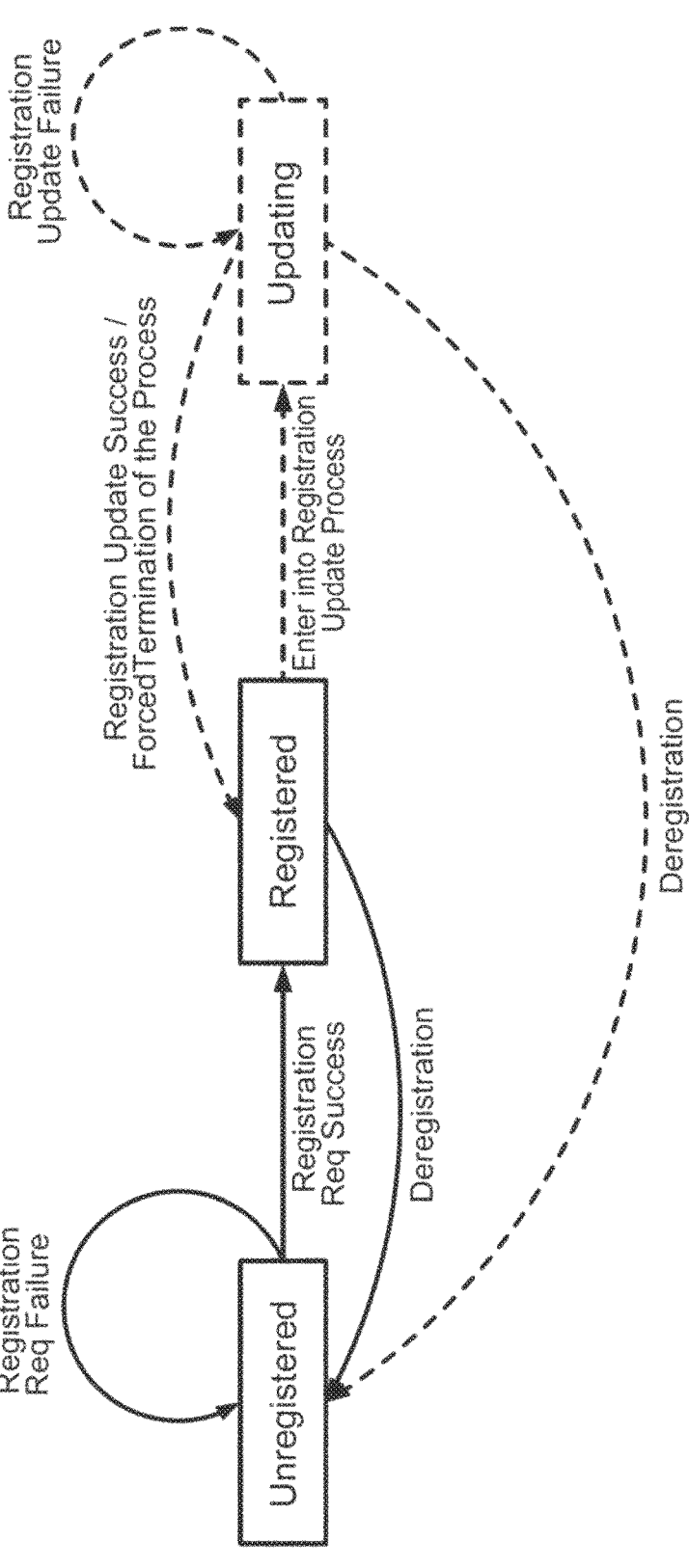
FIG. 9 is an improved registration state diagram according to an exemplary embodiment of the present disclosure.

FIG. 9 illustrates the improved registration state diagram according to the present exemplary embodiment. A point of the improved registration state diagram is that an "Updating" (second state) terminal, which is a new state transitionable between the "Updating" (second state) terminal and "Registered" (first state), is added. "Updating" has the following features B1 and B2.[0193]

(B1) Even when a transition from "Registered" to "Updating" occurs, the grant given to the communication device 110 is maintained. The communication device 110 having the grant can perform radio wave transmission according to the state of the grant in a grant state diagram (not illustrated) representing a state transition regarding the grant. For example, in a state where radio wave transmission is permitted by the communication control device 130, radio wave transmission is possible, and in a state where radio wave transmission is prohibited, radio wave transmission cannot be performed.

(B2) A registration request transmitted from the communication device 110 at a time of "Updating" is treated as a registration update request according to the present exemplary embodiment. The registration update request is a request to update operator information about an operator who operates the communication device 110, from a lender operator to a borrower operator. The registration update request may explicitly or implicitly include information requesting the maintenance of the grant (permission for priority utilization of the frequency band) of the communication device 110. Note that a registration request transmitted from the communication device 110 at a time of "Registered" is treated as a re-registration, and all the grants held by the communication device 110 are discarded, and the radio wave transmission cannot be performed. In a case where a registration request is transmitted at a time of "Registered", the communication device 110 needs to discard all the held grants before transmitting the registration request. Note that the registration request described in <2.1 Registration Procedure> described above is a registration request transmitted from the communication device 110 at a time of "Unregistered". Here, the registration update request is defined by diverting the incumbent registration request, but the registration update request can be newly defined. In this case, the feature of (B2) may be treated as optional. The registration update request described in the following description may be either one obtained by diverting an incumbent registration request or one newly defined.

Here, it is assumed that the registration update request has the following features C1 to C3.

(C1) Among parameters specified in the registration request, only parameters that do not influence calculation of higher tier protection having a higher priority than the PA may be included. That is, parameters related to the installation position, the antenna, the transmission power, and the like are not included. Examples of the parameters that may be included (parameters to be updated) include an operator ID (such as the UR-ID), a call sign, measurement function information (measCapability), CBSD version related information (cbsdInfo), and the like. Note that the higher tier includes a primary system, such as a radar system, having a higher priority than the PA.

(C2) Even when the registration update request is transmitted, the communication device 110 does not discard the held grant.

(C3) Even when the registration update request is received, the communication control device 130 does not discard the grant held by the communication device 110.

Furthermore, since in the improved registration state diagram in FIG. 9, the new state "Updating" and new transition conditions are added to the registration state diagram in FIG. 8, there is an advantage that the implementation of an incumbent communication device (CBSD) is not influenced. The vendor of the communication device 110 is only required to additionally implement the new state and the new transition conditions, and is also only required to perform the operation test only for the additional portion. Therefore, it is possible to suppress temporal, labor, and financial costs. In addition, a problem of backward compatibility due to the introduction of the procedure for leasing the communication device 110 and the grant according to the present exemplary embodiment does not occur.

A communication system of the present exemplary embodiment enabling the procedure for leasing the communication device 110 and the grant on the basis of the registration state diagram improved in this way will be described in more detail.

Figure 11:
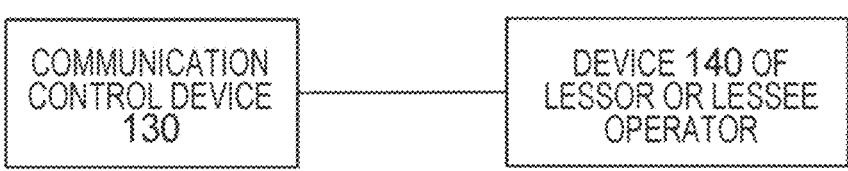
FIG. 11 illustrates a device of a lessor or lessee operator connected to a communication control device.
Figure 12:
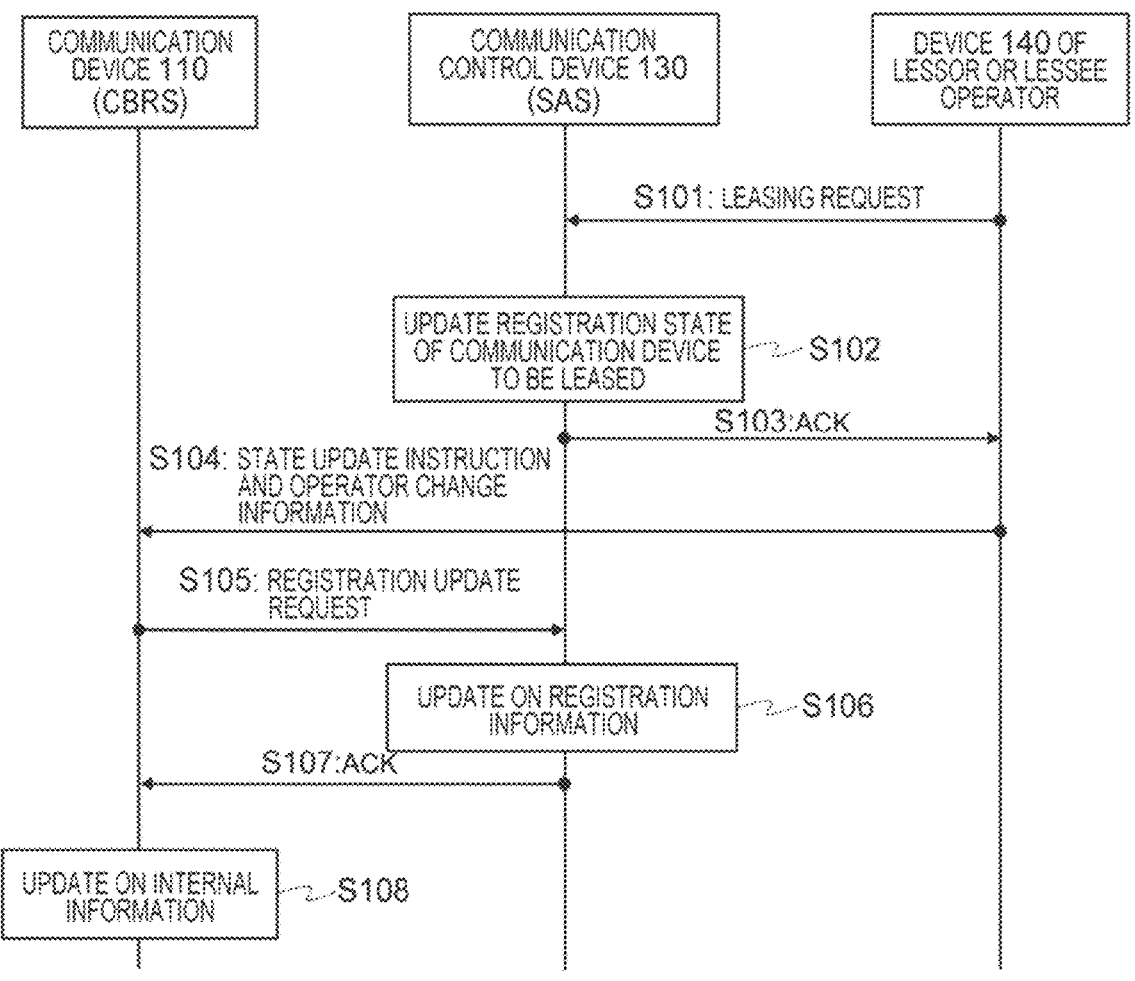
FIG. 12 is a sequence diagram of an example of operation performed among a communication device, the communication control device, and a terminal.

FIG. 10 is a block diagram of a communication system according to an exemplary embodiment of the present disclosure. The communication system in FIG. 10 includes the communication device 110 and the communication control device 130. FIG. 11 illustrates a device 140 of the lessor or lessee operator connected to the communication control device 130 in FIG. 10. FIG. 12 is an operation sequence diagram performed among the communication device 110, the communication control device 130, and the device 140. More specifically, FIG. 12 illustrates a sequence of a procedure for leasing the communication device 110 and a permission (grant) for priority utilization of a frequency band. In the following description, it is assumed that all the communication devices 110 constituting the PPA #2 in FIG. 7 and the grants thereof are leased.

The communication system in FIG. 10 includes the communication device 110 and the communication control device 130. The device 140 in FIG. 11 may be included in the communications system. The device 140 is a device of the lessor or lessee operator of the communication device 110. The device 140 is connected to the communication control device 130 in a wired or wireless manner. The device 140 is, for example, a personal computer (PC) connected to a fixed line, and in this case, the device 140 communicates with the communication control device 130 by, for example, accessing a dedicated website from the PC. Note that in a case where the device 140 is wirelessly connected, the device 140 may be the terminal 120 in FIG. 1. Although FIG. 11 illustrates a configuration in which the device 140 directly communicates with the communication control device 130, a configuration in which the device 140 uses the communication device 110 as a relay device to communicate with the communication control device 130 via the relay device is also possible. Furthermore, the device 140 can also be configured to directly communicate with the communication device 110. In FIG. 10, only blocks regarding portions that perform processing mainly related to the present exemplary embodiment are illustrated, and illustration of blocks regarding other processing is omitted.

The communication control device 130 includes a reception unit 31, a management unit 32, a transmission unit 34, a control unit 35, and a storage unit 36. The control unit 35 controls the entire communication control device 130 by controlling each element in the communication control device 130.

The communication device 110 includes a reception unit 11, a management unit 13, a transmission unit 14, a control unit 15, and a storage unit 16. The control unit 15 controls the entire communication device 110 by controlling each element in the communication device 110.

In the storage unit 36 of the communication control device 130, various types of information preliminarily necessary for communication with the communication device 110, other communication control devices, and the device 140 are preliminarily stored. As an example, the storage unit 36 stores registration information and a registration state diagram about the communication device 110 that has been registered. The registration information includes, for example, an ID of the communication device 110, an ID of the operator who operates the communication device 110 (a lessor or lessee operator), an ID of a grant of the communication device 110 (grant ID), and the like. A state transition diagram (not illustrated) of the grant of the communication device 110 and the state of the grant may be stored in the storage unit 36.

In the storage unit 16 of the communication device 110, various types of information preliminarily necessary for communication with the communication control device 130 and the device 140 are preliminarily stored. The storage unit 16 stores internal information about the communication device 110, as an example. The internal information includes, for example, a registration state diagram of the communication device 110, IDs of the lessor and lessee operators of the communication device 110, parameters, such as a setting value of transmission power of the communication device 110, and an ID of the communication device 110.

The device 140 is, for example, a computer device, such as a smartphone, a tablet, a laptop PC, or a desktop PC.

Each processing block of the communication control device 130, the communication device 110, and the device 140 includes a hardware circuit, software (programs and the like), or both of a hardware circuit and software (programs and the like). The storage unit 36 and the storage unit 16 include arbitrary storage devices, such as a memory device, a magnetic storage device, and an optical disk. The storage unit 36 and the storage unit 16 may not be in the communication control device 130 and the communication device 110 but may be externally connected to the communication control device 130 and the communication device 110 in a wired or wireless manner. The transmission unit 34 and the reception unit 31 in the communication control device 130 and the transmission unit 14 and the reception unit 11 in the communication device 110 may include one or more network interfaces according to the number or types of connectable networks.

In a case where the transmission unit 34 and the reception unit 31 in the communication control device 130 and the transmission unit 14 and the reception unit 11 in the communication device 110 perform wireless communication, the communication control device 130 and the communication device 110 may each include at least one antenna.

Hereinafter, it is assumed that the communication device 110 is a CBSD and the communication control device 130 is an SAS, and the procedure for leasing the communication device 110 and the grant will be described in detail.

First, the lessor or lessee operator uses the device 140 to transmit, to the communication control device 130, a leasing request to lease the communication device 110 and the grant (PPA leasing request) (S101 in FIG. 12). The communication control device 130 includes a dedicated form in, for example, a page exclusive to a user associated with a user account. The reception unit 31 of the communication control device 130 receives the leasing request to lease the communication device 110 and the grant via the dedicated form. Alternatively, the reception unit 31 receives, from the device of the lessor or lessee operator in which dedicated application software is installed, the leasing request to lease the communication device 110 and the grant, due to the execution of the software. The reception unit 31 includes a second reception unit that receives the leasing request.

The leasing request to lease the communication device 110 and the grant includes the following information D1 to D3, as an example.

(D1) [in a case where the requester is a lessor] information (UR-ID or the like) that can specify a lessee operator [in a case where the requester is a lessee] information (UR-ID or the like) that can specify a lessor operator (D2) information or a combination of information that can uniquely specify the communication device 110 to be leased (a set of the FCC ID and the serial number, the ID (CBRS ID) of the communication device 110, or the like)

(D3) information indicating the leasing period

The reception unit 31 of the communication control device 130 receives the leasing request. On the basis of the leasing request, the management unit 32 specifies the communication device 110 to be leased. The management unit 32 stores, in the storage unit 36, the information included in the leasing request in association with registration information about the specified communication device 110. The management unit 32 updates the state of a registration state diagram corresponding to the specified communication device 110, from "Registered" to "Updating" (S102). This update corresponds to a case where the transition condition of "Enter into Registration Update Process" in FIG. 9 is satisfied. When the update on the registration state diagram is completed, the transmission unit 34 of the communication control device 130 transmits an ACK response to the device 140, as an acknowledgement indicating that the leasing request has been normally accepted (S103). The ACK response means that the state of the registration state diagram has been updated to "Updating".

The requester (lessor or lessee operator) uses the device 140 to transmit, to the communication device 110, instruction data for state update and operator change information (S104). The operator change information is information notifying that the communication device 110 is changed (or leased) from the lessor operator to the lessee operator. The operator change information includes, for example, information, such as an ID of the lessor operator, an ID of the lessee operator, and the leasing period. The instruction data includes an instruction to cause the communication device

110 to perform a transition of the state in the registration state diagram, from "Registered" to "Updating". The communication device 110 cannot basically recognize by itself the state transition to "Updating" (it is only at the end of the leasing period that the communication device 110 can recognize by itself the transition). Therefore, the communication device 110 is instructed with the instruction data to perform the transition of the registration state.

The reception unit 11 of the communication device 110 receives the instruction data and the operator change information. On the basis of the instruction data, the management unit 13 of the communication device 110 performs a transition of the state of the registration state diagram to "Updating". Furthermore, the management unit 13 updates the internal information on the basis of the operator change information. For example, operator information is updated in such a manner that the correspondence between the lender operator and the borrower operator can be known. The instruction data and the operator change information may be transmitted separately or as integrated information.

Here, the requester may transmit the instruction data for the state transition to "Updating" and the operator change information, to the communication device 110 via, for example, an entity, such as a domain proxy (DP) or a network manager. In either case, it is desirable to transmit the instruction data and the operator change information in the communication device 110 after the device of the requester receives the ACK response (S103) from the communication control device 130.

After the state transition to "Updating", the transmission unit 14 of the communication device 110 (or the DP) transmits a registration update request to the communication control device 130 (S105). The registration update request includes at least information that can specify the communication device 110, and an ID (UR-ID) of the lessee operator. The information that can specify the communication device 110 includes, for example, a set of the FCC ID and the serial number, the ID (CBSD ID) of the communication device 110, or the like. As described above, the registration update request may be a newly defined request, or a registration request used in "Registered" may be diverted. The registration update request is a request to update operator information about an operator who operates the communication device 110, from the lender operator to the borrower operator, and to maintain the grant (permission for priority utilization of a frequency band) of the communication device 110.

The reception unit 31 of the communication control device 130 receives the registration update request from the communication device 110 (or the DP). The reception unit 31 includes a first reception unit that receives the registration update request. On the basis of the registration update request, the management unit 32 updates at least the operator ID (UR-ID) that is the operator information about an operator who operates the communication device 110, among the registration information stored in the storage unit 36 (S106). The grant of the communication device 110 in the registration information is maintained (not discarded). In this manner, the management unit 32 updates the operator information about an operator who operates the communication device 110, from the lender operator to the borrower operator, and maintains the grant (permission for priority utilization of a frequency band) of the communication device 110.

Here, due to implementation of the communication control device 130, there is a case where information associated with an operator is used to generate at least one of the ID of the communication device 110 or the grant ID. The information associated with an operator includes, for example, at least one of a UR-ID, a digital signature, a certificate necessary for access to the communication control device 130, or the like. In this case, the management unit 32 regenerates at least one of the ID of the communication device 110 or the grant ID on the basis of the information associated with the lessee operator, and updates, with the regenerated ID, the at least one of the IDs in the registration information.

After the update on the registration information in the communication control device 130, the transmission unit 34 of the communication control device 130 transmits, to the communication device 110, an ACK response (registration update response) to the registration update request (S107). Here, in a case where at least one of the ID of the communication device 110 or the grant ID is updated in sequence S106, the ACK response includes at least one of the IDs after the update. Furthermore, in a case where the grant ID after the update is included in the ACK response, it is desirable that information showing a correspondence between the grant ID before the update and the grant ID after the update is included. For example, a set of the grant ID before the update and the grant ID after the update may be included. Before or after the transmission of the ACK response, the management unit 32 of the communication control device 130 returns the registration state of the communication device 110 in the registration state diagram, from "Updating" to "Registered". This update corresponds to a case where the transition condition of "Registration Update Success" in FIG. 9 is satisfied.

The reception unit 11 of the communication device 110 receives the ACK response. On the basis of the information included in the ACK response, the communication device 110 updates the internal information (S108). The management unit 13 at least returns the state in the registration state diagram from "Updating" to "Registered". Furthermore, in a case where the ACK response includes the grant ID after the update, the management unit 13 updates the grant ID in the storage unit 16 to the grant ID after the update. Furthermore, in a case where the ACK response includes the ID of the communication device 110 after the update, the ID of the communication device 110 in the storage unit 16 is updated to the ID after the update.

Note that in a case where the registration update request is not received in sequence S105, reception of the registration update request may be attempted for a certain period of time ("Registration Update Failure" in FIG. 9), and in a case where the registration update request cannot be normally received even after the certain period of time has elapsed, processing that forcibly returns to "Registered", or the like may be performed ("Forced Termination of the Process" in FIG. 9) In the case of the forcible return, the registration information and the internal information about the communication device 120 may be returned to the state before the start of the processing. Furthermore, in a case where the registration is canceled in "Updating" ("Deregistration"), a return to "Unregistered" may be performed.

Through such a procedure, it is possible to implement the leasing of the communication device 110 and the grant without discarding the grant of a frequency band the priority utilization of which has been permitted to the communication device 110. Furthermore, compatibility with incumbent specifications can be maintained. In the case of the PPA #2 in FIG. 7, when the leasing procedure is completed for all the communication devices 110 constituting the PPA #2 and the grants, the transfer of the PPA is also implemented at the same time.

Figure 13:
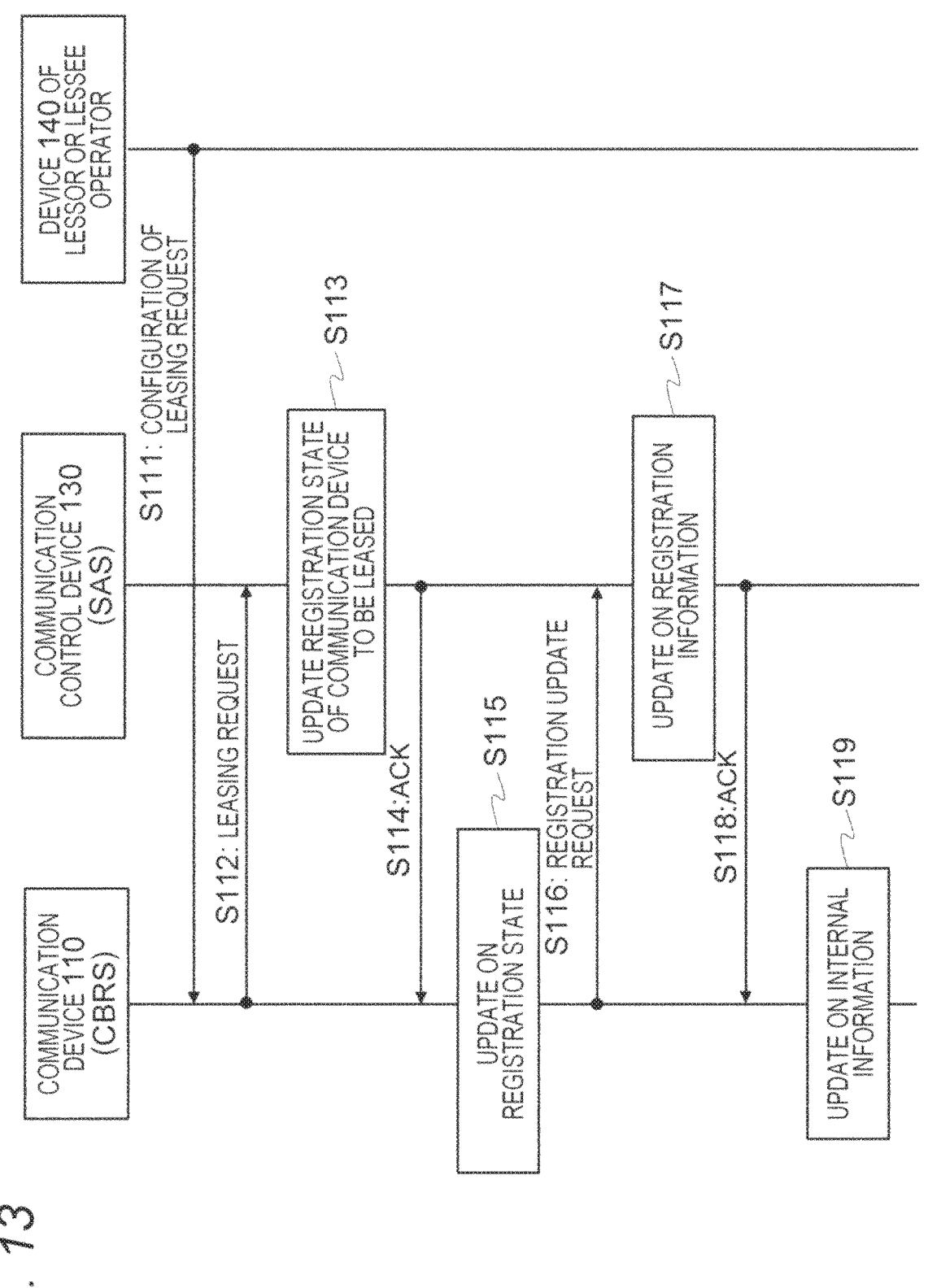
FIG. 13 is a sequence diagram of another example of operation performed among the communication device, the communication control device, and the terminal.

FIG. 13 illustrates another example of a sequence of a procedure for leasing the communication device 110 and permission (grant) for priority utilization of a frequency band. In the sequence in FIG. 12, a leasing request is transmitted from the device 140 of a lessor or lessee operator, but in the sequence in FIG. 13, a leasing request is transmitted from the communication device 110. The repetition of the description of FIG. 12 will be appropriately omitted.

First, a lessor or lessee operator uses the device 140 to transmit, to the communication device 110, configuration information about a leasing request, that is, information regarding items to be included in a leasing request (S111).

The reception unit 11 of the communication device 110 receives, from the device 140, the configuration information about a leasing request (S112). The transmission unit 14 generates a leasing request based on the received configuration information, and transmits the leasing request to the communication control device 130. The information included in the leasing request is similar to D1 to D3 described above.

The reception unit 31 of the communication control device 130 receives the leasing request from the communication device 110. On the basis of the leasing request, the management unit 32 of the communication control device 130 specifies the communication device 110 to be leased, and updates the state of a registration state diagram corresponding to the specified communication device 110, from "Registered" to "Updating" (S113). When the update on the registration state diagram is completed, the transmission unit 34 of the communication control device 130 transmits an ACK response (first acknowledgement) to the device 140, as an acknowledgement indicating that the leasing request has been normally accepted (S114).

The reception unit 11 of the communication device 110 receives the ACK response. On the basis of the ACK response, the management unit 13 performs a transition of the state in a registration state diagram from "Registered" to "Updating" (S115). After the state transition to "Updating", the transmission unit 14 of the communication device 110 (or a DP) transmits a registration update request to the communication control device 130 (S116).

The reception unit 31 of the communication control device 130 receives the registration update request from the communication device 110 (or the DP). On the basis of the registration update request, the management unit 32 updates at least the operator ID (UR-ID) that is operator information about an operator who operates the communication device 110, in the registration information stored in the storage unit 36 (S117). The grant of the communication device 110 is maintained.

After the update on the registration information in the communication control device 130, the transmission unit 34 of the communication control device 130 transmits, to the communication device 110, an ACK response as a response to the registration update request (registration update response) (S118). The ACK response corresponds to a second acknowledgement indicating that the registration update request has been normally accepted. Before or after the transmission of the ACK response, the management unit 32 of the communication control device 130 returns the registration state of the communication device 110 in the registration state diagram, from "Updating" to "Registered".

The reception unit 11 of the communication device 110 receives the ACK response. On the basis of the information included in the ACK response, the communication device 110 rewrites the internal information (S119). The management unit 13 at least returns the state in the registration state diagram from "Updating" to "Registered". Furthermore, similarly to the sequence in FIG. 12, in a case where the ACK response includes the grant ID after the update, the management unit 13 updates the grant ID in the storage unit 16 to the grant ID after the update. Furthermore, in a case where the ACK response includes the ID of the communication device 110 after the update, the ID of the communication device 110 is updated to the ID after the update.

Also through the procedure in FIG. 13, it is possible to implement the leasing of the communication device 110 and the grant without discarding the grant of a frequency band the priority utilization of which has been permitted to the communication device 110. Furthermore, compatibility with incumbent specifications can be maintained. When the leasing procedure is completed for all the communication devices 110 constituting the PPA #2 in FIG. 7 and the grants, the transfer of the PPA is also implemented at the same time.

[PPA Partial Leasing]

Next, a PPA partial leasing procedure for partially leasing a PPA will be described. The basic procedure follows the sequence in FIG. 12 or 13. Therefore, only the difference will be described here. In the following description, it is assumed that among the communication devices 110 constituting the PPA #1 in FIG. 7, the communication devices 110 surrounded by a broken line and the grants thereof are leased.

According to the specifications of the WInnForum, when a change occurs in communication devices constituting a PPA, recalculation of the PPA is necessary. That is, it is necessary to discard the grants once. In order to avoid this, in a PPA registration (R2-SPU-04 specified in WINNF-TS-0112), a plurality of operator IDs (UR-IDs) can be registered only for operators having a lessor and lessee relationship.

In a case where part of the communication devices 110 and the grants of the communication devices 110 are leased in this manner, the following information D4 and D5 are desirably added to a leasing request to lease the communication devices 110 and the grants, in addition to D1 to D3 described above. An intra-PPA coexistence request may be treated as optional.

(D4) information capable of specifying a target PPA (a PPA-ID or the like)

(D5) intra-PPA coexistence request

The intra-PPA coexistence request is a request to ask interference coordination among the communication devices 110 within a PPA. If a PPA is constituted only by communication devices of one operator, interference coordination is only required to be performed according to the operator's own operation policy. However, in a case where part of the communication devices 110 in a PPA is leased, a plurality of operators exists in the PPA, and therefore it may be necessary to restrict interference among the operators. Therefore, in a case where the coordination of interference is desired, the intra-PPA coexistence request may be included in a leasing request to lease the communication device 110 and the grant. However, it is also possible not to include the intra-PPA coexistence request in a leasing request in a case where the interference can be individually coordinated among the operators or in a case where the problem of the interference does not occur.

Figure 14:
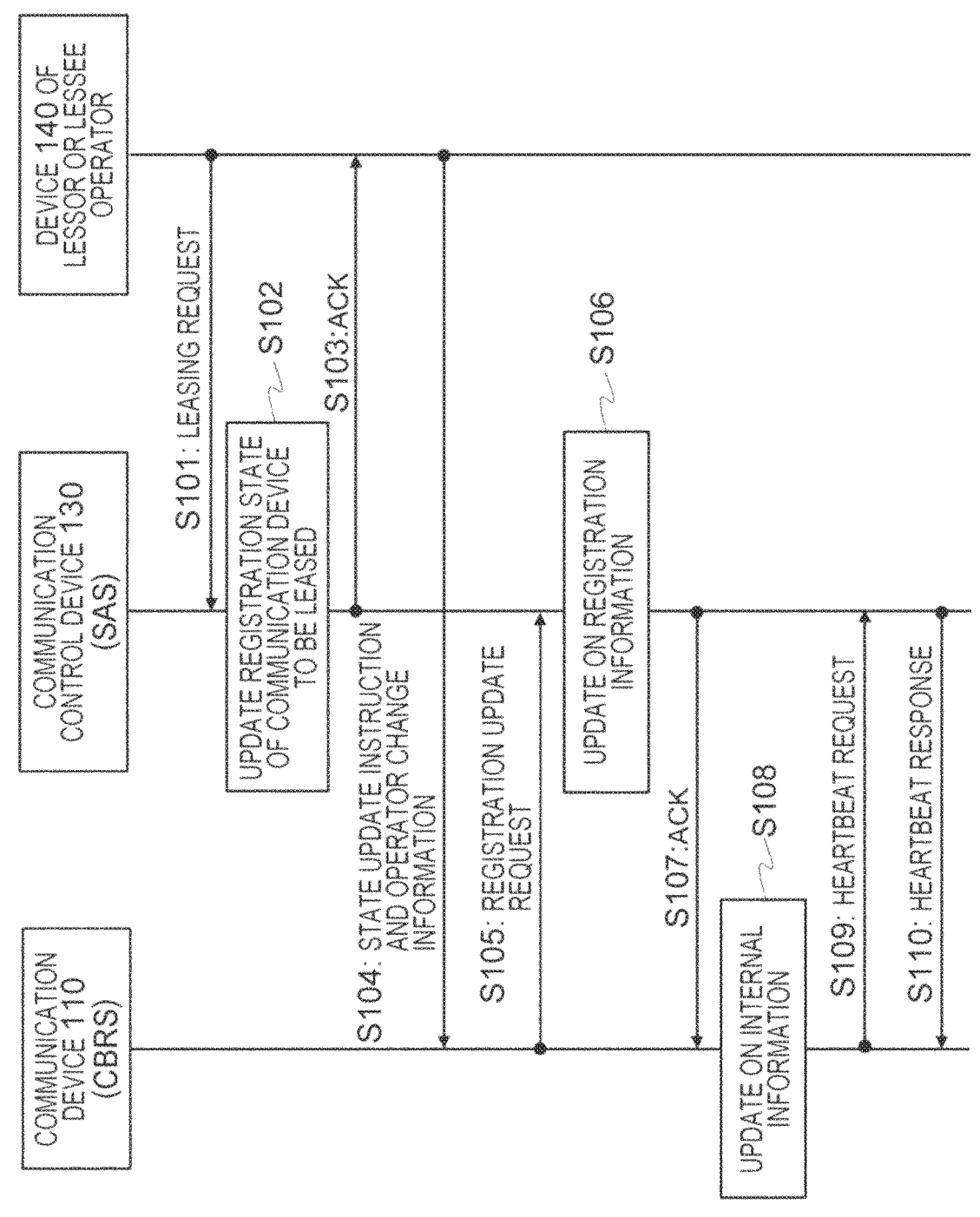
FIG. 14 is a sequence diagram of a further example of operation performed among the communication device, the communication control device, and the terminal.

FIG. 14 illustrates a sequence regarding a PPA partial leasing procedure for partially leasing a PPA. More specifically, FIG. 14 illustrates an example of a sequence of a procedure for leasing part of communication devices 110 constituting a PPA and the grants thereof. FIG. 14 follows the sequence in FIG. 12. The same or corresponding sequence as the sequence in FIG. 12 is denoted by the same reference numeral, and the description thereof is appropriately omitted.

The reception unit 31 of the communication control device 130 receives, from the device 140 of a lessor or lessee operator, a leasing request including the information of D1 to D5 (S101). On the basis of the leasing request, the management unit 32 of the communication control device 130 performs an update on a registration state diagram, and the like, and updates registration information regarding a target PPA (S102). Specifically, the operator ID (UR-ID) indicating the lessee operator is added as registration information about the target PPA.

In a case where the leasing request includes an intra-PPA coexistence request, the control unit 35 of the communication control device 130 performs interference coordination among the communication devices 110 in the PPA. The interference coordination reduces the interference by reducing transmission power of the communication devices 110 (note that changing the frequency channel is not allowed). Here, the transmission power due to the interference coordination is defined as transmission power actually used at a time of radio wave transmission separately from the transmission power permitted by the grant, and does not exceed the transmission power permitted by the grant. Since the transmission power permitted by the grant is not exceeded, it is possible to avoid recalculation of the PPA, re-obtaining of the grant, and the like. The interference coordination may be performed at a timing after reception of a registration update request (S105) or after reception of a heartbeat request (S109), instead of a timing after reception of the leasing request.

Sequence S103 to S106 is similar to sequence S103 to S106 in FIG. 12.

After the update on the registration information in the communication control device 130 (S106), the transmission unit 34 of the communication control device 130 transmits, to the communication device 110, an ACK response (registration update response) to a registration update request (S107). The ACK response includes information (transmission power instruction information) instructing on a coordination value of transmission power actually used by the communication device 110 as a result of the interference coordination. Alternatively, the information instructing on a coordination value of the transmission power may be included in a heartbeat response (S110) to be described later. The transmission power instruction information may be transmitted only to the communication device 110 whose transmission power determined by the control unit 35 is different from the setting value in the registration information.

The management unit 13 of the communication device 110 updates the internal information on the basis of the ACK response received from the communication control device 130 (S108). The update on the internal information is basically similar to the update in FIG. 12, but in a case where a coordination value of the transmission power is instructed on in the ACK response, the transmission power value in the registration information is updated according to the coordination value.

The transmission unit 14 of the communication device 110 transmits, to the communication control device 130, a heartbeat request that is a frequency utilization notification, as a heartbeat procedure (see <2.4 Frequency Utilization Notification (Spectrum Use Notification/Heartbeat)>) (S109). The heartbeat procedure is a procedure for managing radio wave utilization of the communication device based on the grant, and is performed between the communication device 110 and the communication control device 130.

In response to the heartbeat request received from the communication device 110, the transmission unit 34 of the communication control device 130 transmits a heartbeat response (S110). The communication control device 130 may include the above-described coordination value of the transmission power in the heartbeat response instead of the ACK response (registration update response). In this case, the communication control device 130 may set the grant to a state in which radio wave transmission is temporarily stopped (SUSPENDED_GRANT). The temporal stop of radio wave transmission is performed by, for example, including "501" as a response code in the heartbeat response. In a case where it is confirmed that there is no interference with the radio wave by a primary system, such as a radar system, the communication control device 130 may permit the radio wave transmission in the next heartbeat response. The permission for radio wave transmission is performed by, for example, including "zero" as a response code in the heartbeat response.

The reception unit 11 of the communication device 110 receives the heartbeat response transmitted from the communication control device 130. In a case where the heartbeat response includes a coordination value of the transmission power, the management unit 13 updates the transmission power value of the registration information in the storage unit 16 according to the coordination value.

FIG. 14 illustrates an example in which the sequence in FIG. 12 is followed. However, the sequence in FIG. 13 can be similarly followed by also reflecting the difference between FIG. 14 and FIG. 12, in FIG. 13.

[Information Exchange between Communication Control Devices (SASs)]

The communication control device 130 normally and periodically executes a procedure referred to as Coordinated Periodic Activities among SASs (CPAS) with other communication control devices 130. In the CPAS, for example, an exchange of information about the communication devices 110 and the grants is performed. In a procedure for leasing the communication device 110 and the grant of the present exemplary embodiment, it is desirable that when at least one of the ID of the communication device 110 or the grant ID is changed, it is possible to notify that the ID has been changed. However, according to, for example, the incumbent Full Activity Dump mechanism, when at least one of the ID of the communication device 110 or the grant ID is changed, it is not possible to determine whether the ID after the change is a new ID or an updated ID. Therefore, in the information exchange, flag information indicating new information or updated information may be included in every record of the communication device 110. Moreover, similarly, flag information indicating new information or updated information may be included in every record of the grant.

Therefore, it is possible to avoid confusion of another communication control device 130, and to recognize whether an ID acquired from another communication control device 130 is a new ID or an updated ID. This contributes to simplification of internal processing of the communication control device 130.

Figure 15:
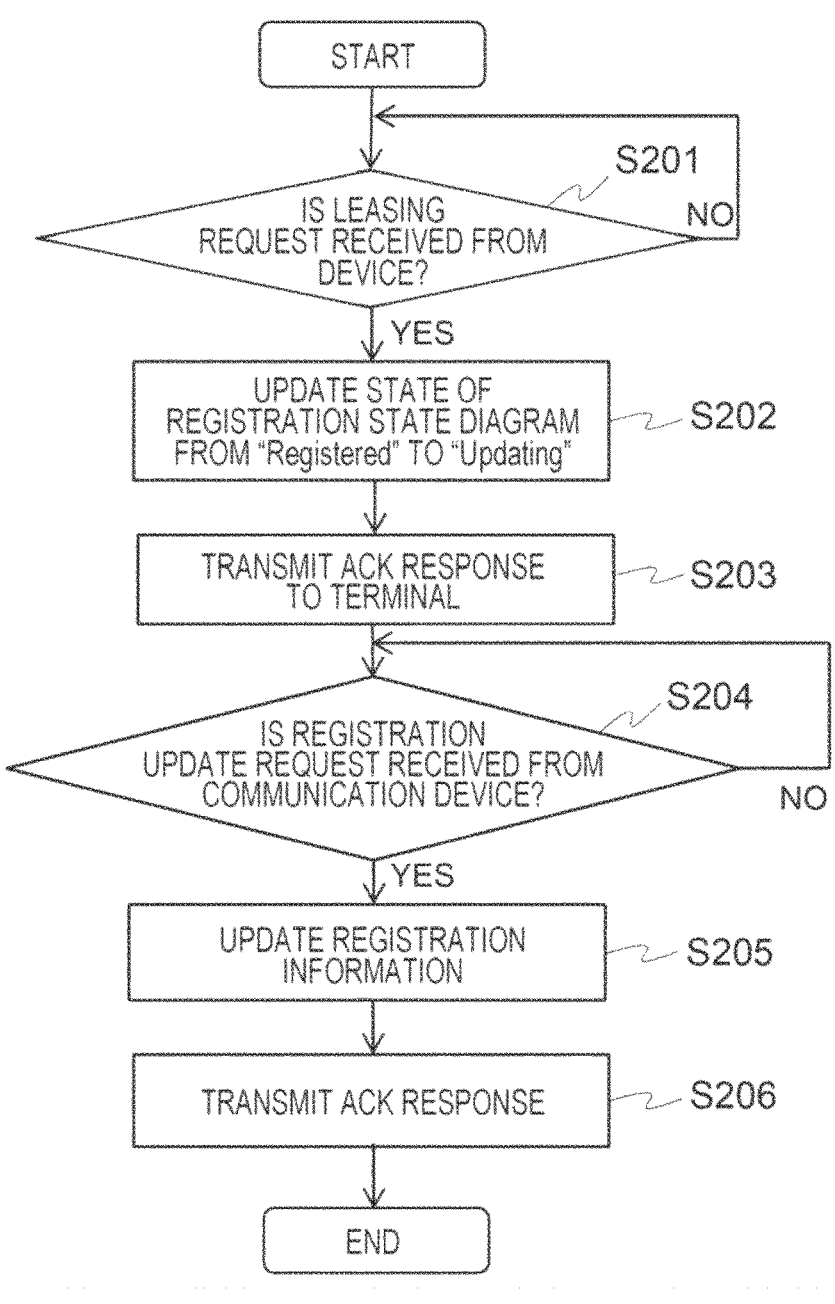
FIG. 15 is a flowchart of an example of operation of the communication control device according to an exemplary embodiment of the present disclosure.

FIG. 15 is a flowchart of an example of operation of the communication control device 130 according to the present exemplary embodiment. The operation in FIG. 15 corresponds to the operation of the communication control device 130 in the sequence in FIG. 12.

The reception unit 31 of the communication control device 130 receives, from the device 140 of a lessor or lessee operator, a leasing request to lease the communication device 110 and the grant (PPA leasing request) (S201).

On the basis of the leasing request, the management unit 32 of the communication control device 130 specifies the communication device 110 to be leased, and updates the state of a registration state diagram corresponding to the specified communication device 110, from "Registered" to "Updating" (S202). The transmission unit 34 of the communication control device 130 transmits an ACK response to the device 140, as an acknowledgement indicating that the leasing request has been normally accepted (S203).

The reception unit 31 of the communication control device 130 receives a registration update request from the communication device 110 (S204). On the basis of the registration update request, the management unit 32 updates at least the operator ID (UR-ID) of the registration information stored in the storage unit 36 (S205). The grant of the communication device 110 is maintained.

After the update on the registration information, the transmission unit 34 of the communication control device 130 transmits, to the communication device 110, an ACK response (registration update response) to the registration update request (S206). Before or after the transmission of the ACK response, the management unit 32 of the communication control device 130 returns the registration state of the communication device 110 in the registration state diagram, from "Updating" to "Registered".

The flow of the example of operation corresponding to the operation of the communication control device 130 in the sequence in FIG. 14 is basically the same as the flow in FIG. 15, but the following processing is added as an example. That is, in a case where a leasing request received from the communication device 110 includes an intra-PPA coexistence request, the control unit 35 of the communication control device 130 performs interference coordination among the communication devices 110 in the PPA. The interference coordination reduces the interference by reducing transmission power of the communication device 110. The communication control device 130 includes a coordination value of the transmission power in the ACK response transmitted in step S206. Alternatively, the coordination value of the transmission power is included in a heartbeat response transmitted in a heartbeat procedure.

FIG. 16 is a flowchart of an example of operation of the communication device 110 according to the present exemplary embodiment. The operation in FIG. 16 corresponds to the operation of the communication device 110 in the sequence in FIG. 12.

The reception unit of the communication device 110 receives, from the device 140 of the requester (the lessor or lessee operator), instruction data for the transition of the state in a registration state diagram from "Registered" to "Updating", and operator change information (S301). When the instruction data is received, on the basis of the instruction data, the management unit 13 of the communication device 110 performs a transition of the state of the registration state diagram from "Registered" to "Updating" (S302).

Furthermore, on the basis of the operator change information, the operator who operates the communication device 110, and the like are updated. The reception unit 11 may receive the requester instruction data and the operator change information via an entity, such as a domain proxy (DP) or a network manager.

After the state transition to "Updating", the transmission unit 14 of the communication device 110 transmits a registration update request to the communication control device 130 (S303).

When receiving an ACK response (registration update response) to the registration update request (S304), the reception unit 11 of the communication device 110 updates the internal information on the basis of the information included in the ACK response (S305). The management unit 13 at least returns the state in the registration state diagram from "Updating" to "Registered".

The flow of the example of operation corresponding to the operation of the communication device 110 in the sequence in FIG. 14 is basically the same as the flow in FIG. 16, but the following processing is added as an example. That is, information that can specify a target PPA and an intra-PPA coexistence request are included in a rental request transmitted from the communication device 110. In a case where a coordination value of the transmission power is included in the ACK response received from the communication control device 130 in step S304 or a heartbeat response received from the communication control device 130 in a heartbeat procedure, the transmission power in the registration information is updated on the basis of the coordination value.

Figure 17:
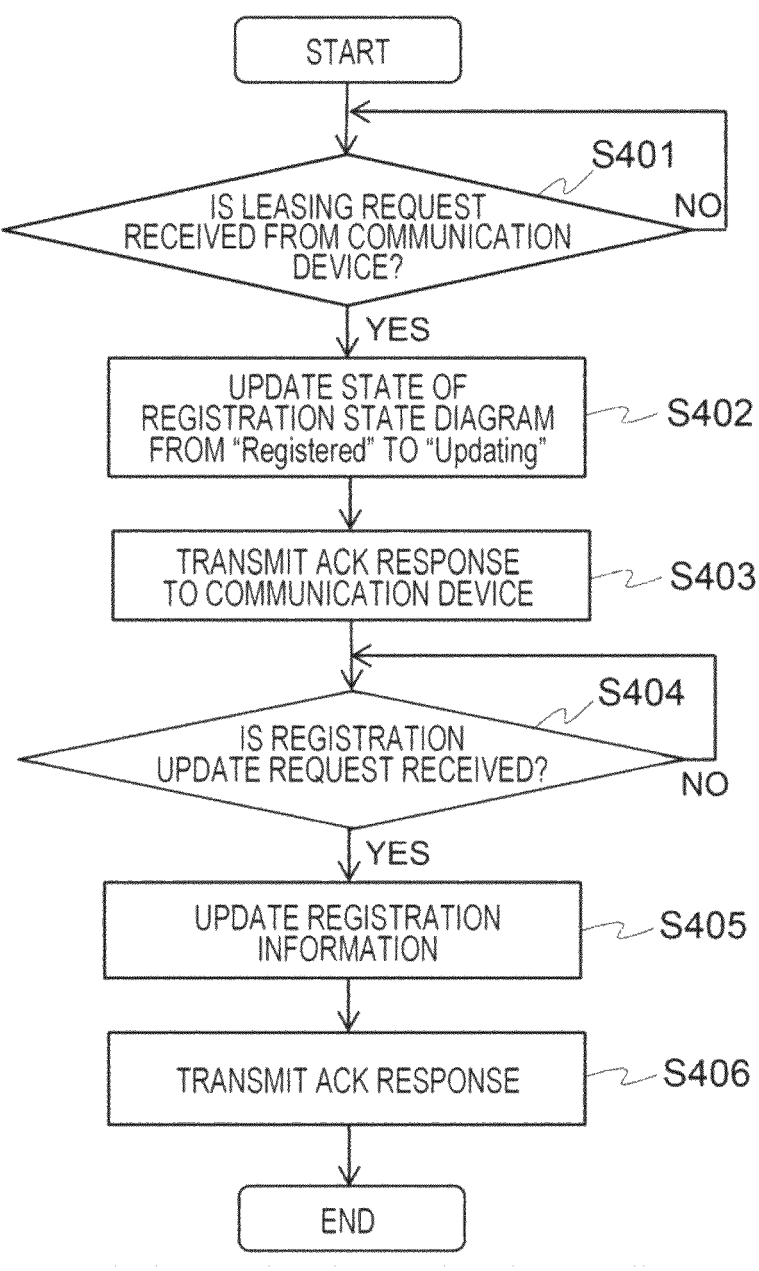
FIG. 17 is a flowchart of another example of operation of the communication control device according to an exemplary embodiment of the present disclosure.

FIG. 17 is a flowchart of another example of operation of the communication control device 130 according to the present exemplary embodiment. The operation in FIG. 17 corresponds to the operation of the communication control device 130 in the sequence in FIG. 13.

The reception unit 31 of the communication control device 130 receives a leasing request from the communication device 110 (S401).

On the basis of the leasing request, the management unit 32 of the communication control device 130 specifies the communication device 110 to be leased, and updates the state of a registration state diagram corresponding to the specified communication device 110, from "Registered" to "Updating" (S402).

When the update on the registration state diagram is completed, the transmission unit 34 of the communication control device 130 transmits an ACK response to the device 140, as an acknowledgement indicating that the leasing request has been normally accepted (S403).

When the reception unit 31 of the communication control device 130 receives a registration update request from the communication device 110 (S404), on the basis of the registration update request, the management unit 32 updates at least the operator ID (UR-ID) of the registration information stored in the storage unit 36 (S405). The grant of the communication device 110 is maintained.

After the update on the registration information, the transmission unit 34 of the communication control device 130 transmits, to the communication device 110, an ACK response (registration update response) to the registration update request (S406). Before or after the transmission of the ACK response, the management unit 32 of the communication control device 130 returns the registration state of the communication device 110 in the registration state diagram, from "Updating" to "Registered".

Figure 18:
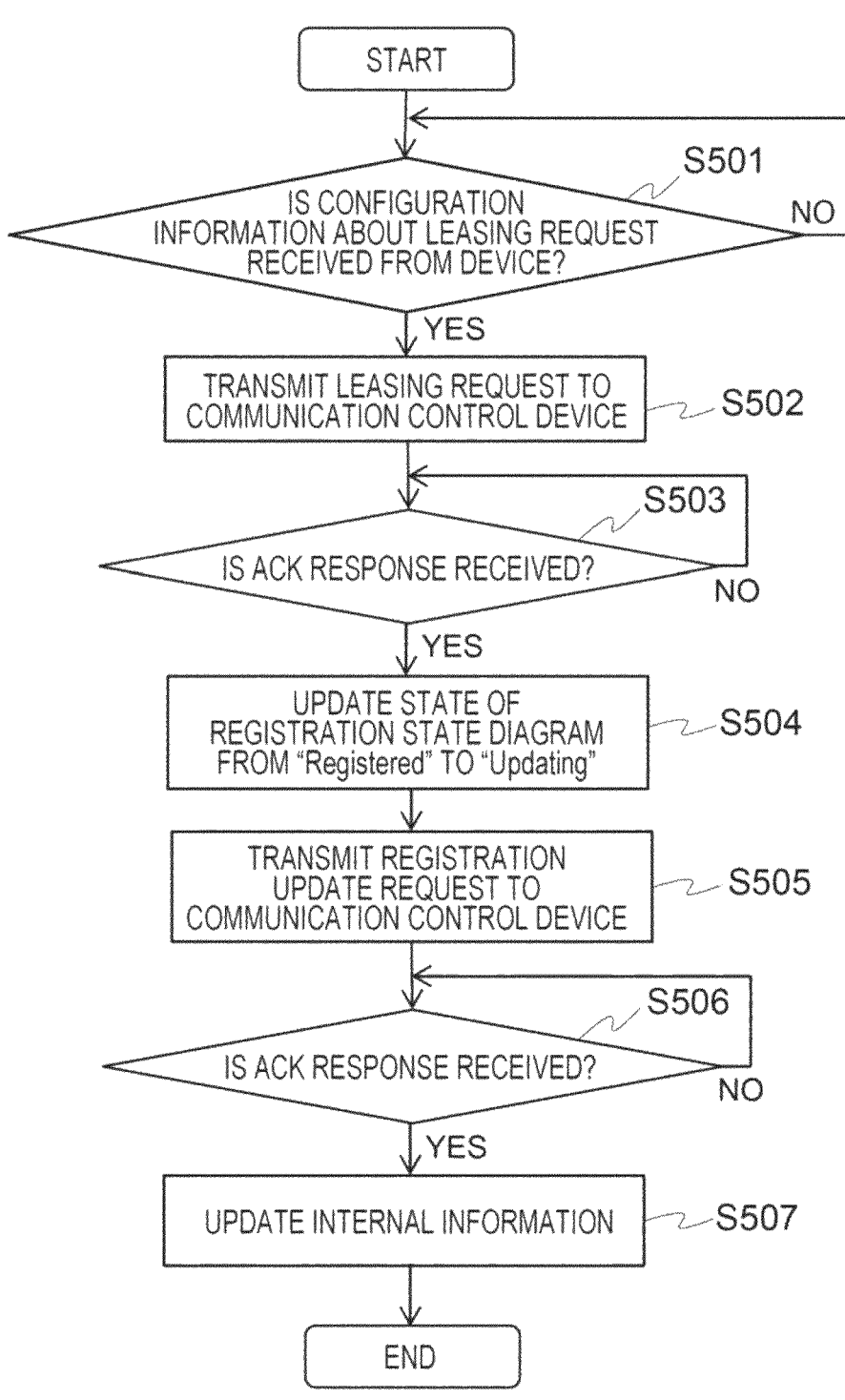
FIG. 18 is a flowchart of another example of operation of the communication device according to an exemplary embodiment of the present disclosure.
Figure 19:
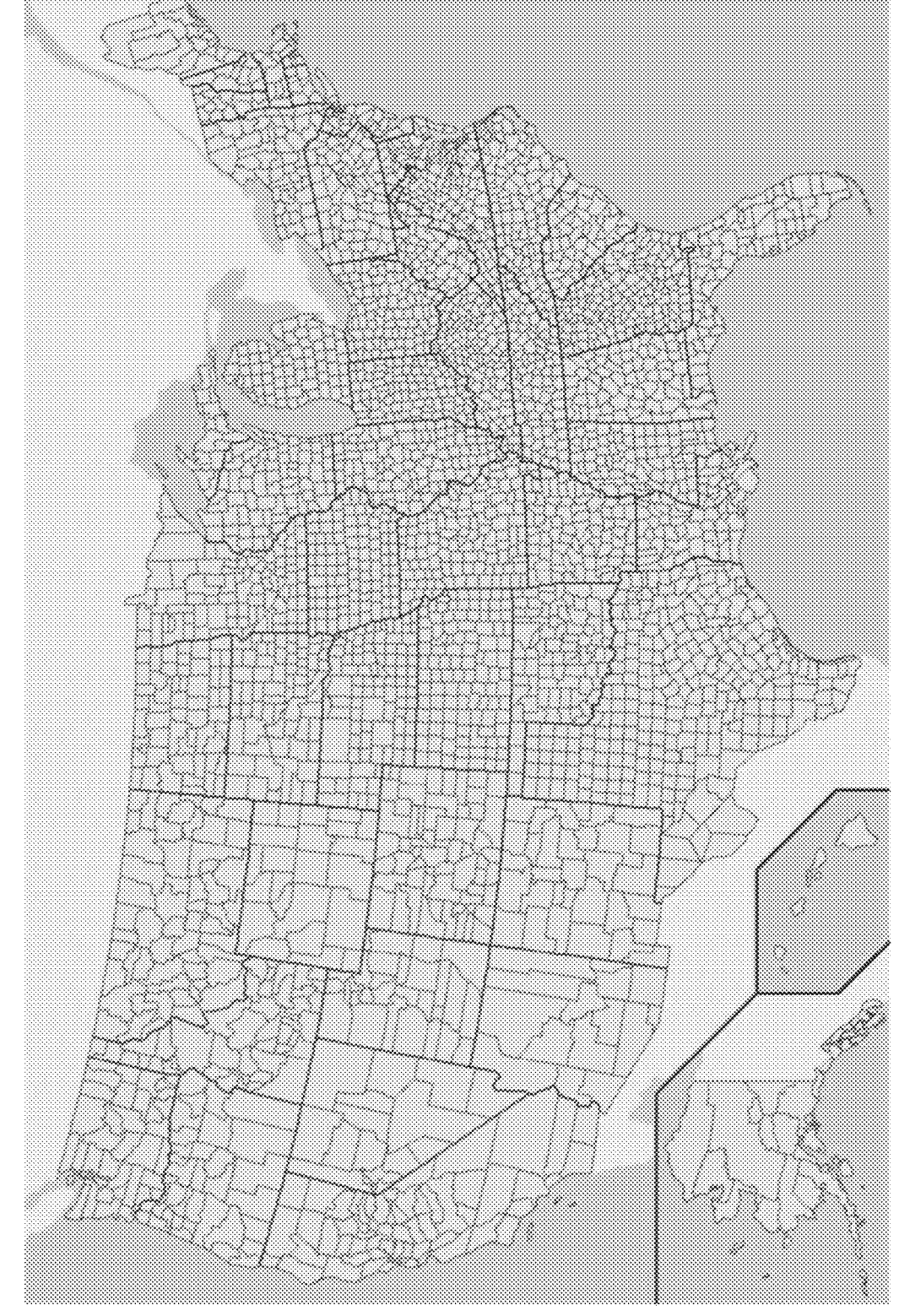
FIG. 19 is a diagram illustrating an example in which each state is divided into areas of priority access licenses (PALs) on a state division map of the United States.

FIG. 18 is a flowchart of another example of operation of the communication device 110 according to the present exemplary embodiment. The operation in FIG. 18 corresponds to the operation of the communication device 110 in the sequence in FIG. 13.

First, the reception unit 11 of the communication device 110 receives, from the device 140 of the lessor or lessee operator, configuration information about a leasing request, that is, information regarding items to be included in a leasing request (S501).

When the configuration information about a leasing request is received, the transmission unit 14 transmits, to the communication control device 130, a leasing request based on the received configuration information (S502).

When the reception unit 11 of the communication device 110 receives an ACK response to the leasing request (S503), the management unit 13 performs a transition of the state in a registration state diagram from "Registered" to "Updating" (S504). After the state transition to "Updating", the transmission unit 14 transmits a registration update request to the communication control device 130 (S505).

When the reception unit 11 of the communication device 110 receives an ACK response to the registration update request (S506), the management unit 13 rewrites the internal information on the basis of the information included in the ACK response (S507). The management unit 13 at least returns the state in the registration state diagram from "Updating" to "Registered".

Note that the above-described exemplary embodiments illustrate an example for embodying the present disclosure, and the present disclosure can be implemented in other various forms. For example, various modifications, substitutions, omissions, or combinations of the various modifications, substitutions, or omissions can be made without departing from the gist of the present disclosure. A form in which such a modification, a substitution, an omission, or the like is made is also included in the scope of the present disclosure, and is similarly included in the scopes of the invention described in the claims and the equivalent thereto.

Furthermore, the effects of the present disclosure described in the present description are merely examples, and there may also be other effects.

Note that the present disclosure can be configured as follows:

[Item 1]

A communication control device including:

a first reception unit that receives a registration update request to update operator information about an operator who operates a communication device permitted to perform priority utilization of a frequency band, from a first operator to a second operator; and a management unit that, on the basis of the registration update request, updates the operator information about an operator who operates the communication device, from the first operator to the second operator, and maintains the permission for priority utilization of the frequency band by the communication device.

[Item 2]

The communication control device according to the item 1, further including a second reception unit that receives a leasing request that indicates that the communication device is leased from the first operator to the second operator, in which the management unit manages a state transition diagram regarding a registration state of the communication device, in a case where the leasing request is received when the registration state of the communication device is a first state, the management unit performs a transition of the registration state of the communication device from the first state to a second state, and in a case where the registration update request is received when the registration state of the communication device is the second state, the management unit updates the operator information about an operator who operates the communication device.

[Item 3]

The communication control device according to the item 2, in which after updating the operator information, the management unit performs a transition of the registration state of the communication device from the second state to the first state.

[Item 4]

The communication control device according to any one of the items 1 to 3, in which of N ones of the communication device operated by the first operator, the first reception unit receives the registration update requests for M, which is smaller than the N, ones of the communication device, and the management unit updates operator information about an operator who operates the M communication devices, from the first operator to the second operator, and maintains permission for priority utilization of the frequency band by the M communication devices.

[Item 5]

The communication control device according to the item 4, further including:

a control unit that determines transmission power of the M communication devices by performing interference coordination between the M communication devices, and the N communication devices except the M communication devices; and a transmission unit that transmits, to the M communication devices, information that gives an instruction on the transmission power of the M communication devices.

[Item 6]

The communication control device according to the item 5, in which the management unit manages a setting value of transmission power of the N communication devices, and the management unit updates a setting value of the transmission power of the M communication devices to the transmission power determined by the control unit.

[Item 7]

The communication control device according to the item 6, in which the transmission unit transmits, only to the communication device the determined transmission power of which is different from the setting value, the information that gives an instruction on the transmission power.

[Item 8]

The communication control device according to the item 5, in which only in a case where the registration update request includes a request for the interference coordination, the control unit performs the interference coordination.

[Item 9]

The communication control device according to any one of the items 1 to 8, in which the second reception unit receives the leasing request from a device of the first operator, a device of the second operator, the communication device, or a proxy that performs processing of the communication device instead of the communication device.

[Item 10]

The communication control device according to any one of the items 1 to 9, in which the first reception unit receives the registration update request from the communication device or a proxy that performs processing of the communication device instead of the communication device.

[Item 11]

The communication control device according to any one of the items 1 to 10, in which the management unit manages a permission identifier of the permission for priority utilization of the frequency band by the communication device, and the management unit updates the permission identifier on the basis of information about the second operator.

[Item 12]

The communication control device according to any one of the items 1 to 11, in which the management unit manages an identifier of the communication device, and the management unit updates the identifier of the communication device on the basis of information about the second operator.

[Item 13]

A communication device including:

a reception unit that receives operator change information that indicates that an operator who operates the communication device permitted by a communication control device to perform priority utilization of a frequency band is changed from a first operator to a second operator; and a transmission unit that, in a case where the operator change information is received, transmits, to the communication control device, a registration update request that requests to update operator information about an operator who operates the communication device, from the first operator to the second operator, and requests to maintain the permission for priority utilization of the frequency band by the communication device.

[Item 14]

The communication device according to the item 13, further including a management unit that manages a state transition diagram regarding a registration state of the communication device, in which the reception unit receives instruction data that causes a transition of the registration state of the communication device from a first state to a second state, and in a case where the instruction data is received when the registration state of the communication device is the first state, the management unit updates the registration state of the communication device to the second state, and in a case where an acknowledgement for the registration update request is received when the registration state of the communication device is the second state, the management unit updates the registration state of the communication device to the first state.

[Item 15]

A communication device including:

a transmission unit that transmits a leasing request that indicates that the communication device permitted by a communication control device to perform priority utilization of a frequency band is leased from a first operator to a second operator; and a reception unit that receives a first acknowledgement for the leasing request, in which in a case where the reception unit receives the first acknowledgement, the transmission unit transmits, to the communication control device, a registration update request that requests to update operator information about an operator who operates the communication device, from the first operator to the second operator, and requests to maintain the permission for priority utilization of the frequency band by the communication device.

[Item 16]

The communication device according to the item 15, further including a management unit that manages a state transition diagram regarding a registration state of the communication device, in which in a case where the first acknowledgement is received when the registration state of the communication device is a first state, the management unit updates the registration state of the communication device to a second state, when the registration state of the communication device is the second state, the transmission unit transmits the registration update request, and in a case where a second acknowledgement for the registration update request is received when the registration state of the communication device is the second state, the management unit updates the registration state of the communication device to the first state.

[Item 17]

The communication device according to the item 15, further including a management unit that manages a setting value of transmission power of the communication device, in which the leasing request includes a request for interference coordination with another communication device operated by the first operator, and in a case where transmission power coordination information that designates transmission power of the communication device coordinated by the interference coordination is received, the management unit updates the setting value of the transmission power of the communication device with the transmission power coordination information.

[Item 18]

A communication control method executed by a communication control device, the communication control method including:

receiving a registration update request to update operator information about an operator who operates a communication device permitted to perform priority utilization of a frequency band, from a first operator to a second operator; and on the basis of the registration update request, updating the operator information about an operator who operates the communication device, from the first operator to the second operator, and maintaining the permission for priority utilization of the frequency band by the communication device.

[Item 19]

A communication method executed by a communication device, the communication method including:

receiving operator change information that indicates that an operator who operates the communication device permitted by a communication control device to perform priority utilization of a frequency band is changed from a first operator to a second operator; and in a case where the operator change information is received, transmitting, to the communication control device, a registration update request that requests to update operator information about an operator who operates the communication device, from the first operator to the second operator, and requests to maintain the permission for priority utilization of the frequency band by the communication device.

[Item 20]

A communication method executed by a communication device, the communication method including:

transmitting a leasing request that indicates that the communication device permitted by a communication control device to perform priority utilization of a frequency band is leased from a first operator to a second operator;

receiving a first acknowledgement for the leasing request; and in a case where the first acknowledgement is received, transmitting, to the communication control device, a registration update request that requests to update operator information about an operator who operates the communication device, from the first operator to the second operator, and requests to maintain the permission for priority utilization of the frequency band by the communication device.

REFERENCE SIGNS LIST

11 Reception unit
13 Management unit
14 Transmission unit
15 Control unit
16 Storage unit
31 Reception unit
32 Management unit
34 Transmission unit
35 Control unit
36 Storage unit
100 Communication network
110, 110A, 110B, 110C Communication device
120 Terminal
130, 130A, 130B Communication control device
110, 110A, 110B, 110C Communication device
130, 130A, 130B Communication control device
140 Device of lessor or lessee operator

The invention claimed is:

1. A communication control device comprising:

circuitry configured to:

receive a registration update request to update operator information about an operator who operates a communication device permitted to perform priority utilization of a frequency band, from a first operator to a second operator;

on a basis of the registration update request, update the operator information about an operator who operates the communication device, from the first operator to the second operator, and maintain the permission for priority utilization of the frequency band by the communication device;

receive a leasing request that indicates that the communication device is leased from the first operator to the second operator, wherein the circuitry:

manages a state transition regarding a registration state of the communication device, in a case where the leasing request is received when the registration state of the communication device is a first state, performs a transition of the registration state of the communication device from the first state to a second state, and in a case where the registration update request is received when the registration state of the communication device is the second state, updates the operator information about an operator who operates the communication device.

2. The communication control device according to claim 1, wherein after updating the operator information, the circuitry performs a transition of the registration state of the communication device from the second state to the first state.

3. The communication control device according to claim 1, wherein of N ones of the communication device operated by the first operator, the circuitry receives the registration update requests for M, which is smaller than the N, ones of the communication device, and the circuitry updates operator information about an operator who operates the M communication devices, from the first operator to the second operator, and maintains permission for priority utilization of the frequency band by the M communication devices.

4. The communication control device according to claim 3, wherein the circuitry:

determines transmission power of the M communication devices by performing interference coordination between the M communication devices, and the N communication devices except the M communication devices; and transmits, to the M communication devices, information that gives an instruction on the transmission power of the M communication devices.

5. The communication control device according to claim 4, wherein the circuitry:

manages a setting value of transmission power of the N communication devices, and updates a setting value of the transmission power of the M communication devices to the transmission power determined by the control unit.

6. The communication control device according to claim 5, wherein the circuitry transmits, only to the communication device the determined transmission power of which is different from the setting value, the information that gives an instruction on the transmission power.

7. The communication control device according to claim 4, wherein, only in a case where the registration update request includes a request for the interference coordination, the circuitry performs the interference coordination.

8. The communication control device according to claim 1, wherein the circuitry receives the leasing request from a device of the first operator, a device of the second operator, the communication device, or a proxy that performs processing of the communication device instead of the communication device.

9. The communication control device according to claim 1, wherein the circuitry receives the registration update request from the communication device or a proxy that performs processing of the communication device instead of the communication device.

10. The communication control device according to claim 1, wherein the circuitry:

manages a permission identifier of the permission for priority utilization of the frequency band by the communication device, and updates the permission identifier on a basis of information about the second operator.

11. The communication control device according to claim 1, wherein the circuitry:

manages an identifier of the communication device, and updates the identifier of the communication device on a basis of information about the second operator.

12. A communication control method executed by a communication control device, the communication control method comprising:

receiving a registration update request to update operator information about an operator who operates a communication device permitted to perform priority utilization of a frequency band, from a first operator to a second operator; and on a basis of the registration update request, updating the operator information about an operator who operates the communication device, from the first operator to the second operator, and maintaining the permission for priority utilization of the frequency band by the communication device;

receiving a leasing request that indicates that the communication device is leased from the first operator to the second operator, wherein the method further comprises:

managing a state transition regarding a registration state of the communication device, in a case where the leasing request is received when the registration state of the communication device is a first state, performing a transition of the registration state of the communication device from the first state to a second state, and in a case where the registration update request is received when the registration state of the communication device is the second state, updating the operator information about an operator who operates the communication device.

* * * * *